(12) United States Patent
Alagna et al.

(10) Patent No.: US 7,624,110 B2
(45) Date of Patent: Nov. 24, 2009

(54) METHOD, SYSTEM, AND COMPUTER PROGRAM PRODUCT FOR SECURITY WITHIN A GLOBAL COMPUTER NETWORK

(75) Inventors: Michael Anthony Alagna, Austin, TX (US); Charles Andrew Payne, Austin, TX (US); Luca Loiodice, Austin, TX (US); Todd Allen Smith, Austin, TX (US)

(73) Assignee: Symantec Corporation, Mountain View, CA (US)

( * ) Notice: Subject to any disclaimer, the term of this patent is extended or adjusted under 35 U.S.C. 154(b) by 763 days.

(21) Appl. No.: 10/733,655

(22) Filed: Dec. 11, 2003

(65) Prior Publication Data

US 2004/0123157 A1 Jun. 24, 2004

Related U.S. Application Data

(60) Provisional application No. 60/433,345, filed on Dec. 13, 2002.

(51) Int. Cl.
G06F 17/30 (2006.01)
(52) U.S. Cl. .......................... 707/9; 713/155
(58) Field of Classification Search .................. 707/3, 707/10, 100–104.1, 9; 713/152, 155, 166; 715/234, 205
See application file for complete search history.

(56) References Cited

U.S. PATENT DOCUMENTS

| | | | |
|---|---|---|---|
| 5,121,345 A | 6/1992 | Lentz | |
| 5,377,354 A | 12/1994 | Scannell et al. | |
| 5,438,433 A | 8/1995 | Reifman et al. | |
| 5,440,723 A | 8/1995 | Arnold et al. | |
| 5,537,540 A | 7/1996 | Miller et al. | |
| 5,557,789 A | 9/1996 | Mase et al. | |
| 5,619,648 A | 4/1997 | Canale et al. | |
| 5,634,005 A | 5/1997 | Matsuo | |
| 5,649,182 A | 7/1997 | Reitz | |
| 5,675,507 A | 10/1997 | Bobo, II | |
| 5,678,041 A | 10/1997 | Baker et al. | |
| 5,696,898 A | 12/1997 | Baker et al. | |
| 5,790,789 A | 8/1998 | Suarez | |
| 5,796,948 A | 8/1998 | Cohen | |

(Continued)

FOREIGN PATENT DOCUMENTS

EP 0375138 6/1990

(Continued)

OTHER PUBLICATIONS

Clark, et al.; "PCMAIL: A distributed mail system for personal computers"; May 1986; MIT Laboratory for Computer Science; 24 pages.

(Continued)

*Primary Examiner*—Cheryl Lewis
(74) *Attorney, Agent, or Firm*—Meyertons Hood Kivlin Kowert & Goetzel, P.C.

(57) ABSTRACT

In a first embodiment, an information handling system determines whether a resource is likely misrepresented as a trusted resource within a global computer network. In a second embodiment, the information handling system outputs an indication of whether a resource within a global computer network is recognized as a known trusted resource.

41 Claims, 21 Drawing Sheets

U.S. PATENT DOCUMENTS

| | | | |
|---|---|---|---|
| 5,802,277 | A | 9/1998 | Cowlard |
| 5,809,242 | A | 9/1998 | Shaw et al. |
| 5,822,527 | A | 10/1998 | Post |
| 5,826,022 | A | 10/1998 | Nielsen |
| 5,835,087 | A | 11/1998 | Herz |
| 5,845,263 | A | 12/1998 | Camaisa et al. |
| 5,862,325 | A | 1/1999 | Reed et al. |
| 5,864,684 | A | 1/1999 | Nielsen |
| 5,870,546 | A * | 2/1999 | Kirsch ............... 709/205 |
| 5,870,548 | A | 2/1999 | Nielsen |
| 5,874,955 | A | 2/1999 | Rogowitz et al. |
| 5,884,033 | A | 3/1999 | Duvall et al. |
| 5,889,943 | A | 3/1999 | Ji et al. |
| 5,905,863 | A | 5/1999 | Knowles et al. |
| 5,919,257 | A | 7/1999 | Trostle |
| 5,930,479 | A | 7/1999 | Hall |
| 5,956,481 | A | 9/1999 | Walsh et al. |
| 5,968,117 | A | 10/1999 | Schuetze |
| 5,978,837 | A | 11/1999 | Foladare et al. |
| 5,999,932 | A | 12/1999 | Paul |
| 5,999,967 | A | 12/1999 | Sundsted |
| 6,023,700 | A | 2/2000 | Owens et al. |
| 6,023,723 | A | 2/2000 | McCormick et al. |
| 6,052,709 | A | 4/2000 | Paul |
| 6,073,165 | A | 6/2000 | Narasimhan et al. |
| 6,088,804 | A | 7/2000 | Hill et al. |
| 6,112,227 | A | 8/2000 | Heiner |
| 6,146,026 | A | 11/2000 | Ushiku |
| 6,157,630 | A | 12/2000 | Adler et al. |
| 6,158,031 | A | 12/2000 | Mack et al. |
| 6,161,130 | A | 12/2000 | Horvitz et al. |
| 6,173,364 | B1 | 1/2001 | Zenchelsky et al. |
| 6,182,118 | B1 | 1/2001 | Finney et al. |
| 6,182,227 | B1 | 1/2001 | Blair et al. |
| 6,189,026 | B1 | 2/2001 | Birrell et al. |
| 6,195,686 | B1 | 2/2001 | Moon et al. |
| 6,199,102 | B1 | 3/2001 | Cobb |
| 6,216,165 | B1 | 4/2001 | Woltz et al. |
| 6,226,630 | B1 | 5/2001 | Billmers |
| 6,230,156 | B1 | 5/2001 | Hussey |
| 6,266,774 | B1 | 7/2001 | Sampath et al. |
| 6,272,641 | B1 | 8/2001 | Ji |
| 6,314,454 | B1 | 11/2001 | Wang et al. |
| 6,327,610 | B2 | 12/2001 | Uchida et al. |
| 6,330,588 | B1 | 12/2001 | Freeman |
| 6,334,140 | B1 | 12/2001 | Kawamata |
| 6,360,254 | B1 | 3/2002 | Linden et al. |
| 6,377,949 | B1 | 4/2002 | Gilmour |
| 6,393,568 | B1 | 5/2002 | Ranger et al. |
| 6,411,947 | B1 | 6/2002 | Rice et al. |
| 6,421,709 | B1 | 7/2002 | McCormick et al. |
| 6,438,125 | B1 * | 8/2002 | Brothers ............... 370/352 |
| 6,438,608 | B2 | 8/2002 | Biliris et al. |
| 6,466,966 | B1 * | 10/2002 | Kirsch et al. ............... 709/203 |
| 6,505,237 | B2 | 1/2003 | Beyda et al. |
| 6,523,120 | B1 | 2/2003 | Strasnick |
| 6,546,416 | B1 | 4/2003 | Kirsch |
| 6,549,957 | B1 | 4/2003 | Hanson et al. |
| 6,571,275 | B1 | 5/2003 | Dong et al. |
| 6,654,787 | B1 | 11/2003 | Aronson et al. |
| 6,671,812 | B1 | 12/2003 | Balasubramaniam et al. |
| 6,718,321 | B2 | 4/2004 | Birrell et al. |
| 6,732,157 | B1 | 5/2004 | Gordon et al. |
| 6,757,713 | B1 | 6/2004 | Ogilvie et al. |
| 6,785,732 | B1 * | 8/2004 | Bates et al. ............... 709/232 |
| 6,792,543 | B2 | 9/2004 | Pak et al. |
| 6,836,272 | B2 | 12/2004 | Leung et al. |
| 6,859,833 | B2 * | 2/2005 | Kirsch et al. ............... 709/224 |
| 7,010,698 | B2 | 3/2006 | Sheymov |
| 7,072,944 | B2 * | 7/2006 | Lalonde et al. ............... 709/206 |
| 7,093,121 | B2 * | 8/2006 | Barton et al. ............... 713/150 |
| 7,096,500 | B2 | 8/2006 | Roberts et al. |
| 7,114,177 | B2 | 9/2006 | Rosenberg et al. |
| 7,315,893 | B2 | 1/2008 | Vinberg |
| 7,331,062 | B2 | 2/2008 | Alagna et al. |
| 2002/0007301 | A1 | 1/2002 | Reuning |
| 2002/0046065 | A1 * | 4/2002 | Nighan ............... 705/4 |
| 2002/0116635 | A1 | 8/2002 | Sheymov |
| 2002/0147780 | A1 * | 10/2002 | Liu et al. ............... 709/206 |
| 2002/0150243 | A1 | 10/2002 | Craft et al. |
| 2002/0174137 | A1 | 11/2002 | Wolff et al. |
| 2003/0033536 | A1 | 2/2003 | Pak et al. |
| 2003/0097451 | A1 * | 5/2003 | Bjorksten et al. ............... 709/228 |
| 2003/0159070 | A1 | 8/2003 | Mayer et al. |
| 2003/0174137 | A1 | 9/2003 | Leung et al. |
| 2004/0054917 | A1 | 3/2004 | Obrecht et al. |
| 2004/0064736 | A1 | 4/2004 | Obrecht et al. |
| 2004/0078422 | A1 * | 4/2004 | Toomey ............... 709/202 |
| 2004/0088570 | A1 * | 5/2004 | Roberts et al. ............... 713/201 |
| 2004/0098607 | A1 | 5/2004 | Alagna et al. |
| 2004/0177120 | A1 | 9/2004 | Kirsch et al. |
| 2004/0187023 | A1 | 9/2004 | Alagna et al. |
| 2004/0230820 | A1 * | 11/2004 | Hui Hsu et al. ............... 713/200 |
| 2005/0050222 | A1 | 3/2005 | Packer |
| 2005/0081059 | A1 | 4/2005 | Bandini et al. |
| 2005/0108339 | A1 | 5/2005 | Gleeson et al. |
| 2005/0108340 | A1 | 5/2005 | Gleeson et al. |
| 2005/0137980 | A1 * | 6/2005 | Bullock et al. ............... 705/44 |
| 2006/0031298 | A1 | 2/2006 | Hasegawa |
| 2006/0053490 | A1 | 3/2006 | Herz et al. |
| 2006/0168006 | A1 | 7/2006 | Shannon et al. |
| 2006/0251068 | A1 | 11/2006 | Judge et al. |
| 2006/0288076 | A1 | 12/2006 | Cowings et al. |
| 2007/0101423 | A1 | 5/2007 | Oliver et al. |
| 2007/0143432 | A1 | 6/2007 | Klos et al. |

FOREIGN PATENT DOCUMENTS

| | | |
|---|---|---|
| EP | 0420779 | 4/1991 |
| EP | 0720333 | 7/1996 |
| GB | 2271002 | 3/1994 |
| JP | 10240649 | 6/1998 |
| WO | 9635994 | 11/1996 |
| WO | 9837680 | 8/1998 |
| WO | 0203178 | 1/2002 |
| WO | WO 02/03178 | 1/2002 |
| WO | 02103533 | 12/2002 |
| WO | WO 02/103533 | 12/2002 |
| WO | 2004021197 | 3/2004 |
| WO | WO 2004/021197 | 3/2004 |
| WO | 2004055632 | 7/2004 |
| WO | WO 2004/055632 | 7/2004 |
| WO | 2004072777 | 8/2004 |
| WO | WO 2004/072777 | 8/2004 |

OTHER PUBLICATIONS

Harker, Robert; "Selectively Rejecting SPAM Using Sendmil"; Proceedings of the 11th Conference on Systems Administration; Oct. 1997; 17 pages.

Kaufman, et al; "Network Security: Private Communication in a Public World—Revocation—Section 15.4"; 2nd Edition; Prentice Hall Series in Computer Networking and Distributed Systems; 2002; 4 pages.

U.S. Appl. No. 10/117,065, entitled "Apparatus and Method for Weighted and Aging Spam Filtering Rules", by Aronson, et al., filed on Apr. 4, 2002.

U.S. Appl. No. 10/871,583, entitled "System and method for filtering spam messages utilizing URL filtering module", by Cowings, et al., filed on Jun. 17, 2004.

U.S. Appl. No. 11/116,572, entitled "Method and apparatus for creating aggressive anti-spam rules", by Chin, et al., filed on Apr. 27, 2005.

U.S. Appl. No. 11/127,814, entitled "Method and apparatus for detecting spam in email messages and email attachments", by Cowings, filed on May 11, 2005.

U.S. Appl. No. 11/157,327, entitled "Method and apparatus for grouping spam email messages", by Jensen, filed on Jun. 20, 2005.

U.S. Appl. No. 11/048,958, entitled "Method and apparatus for determining the source of an email message", by Mantel, filed on Feb. 1, 2005.

U.S. Appl. No. 11/127,813, entitled "Method and apparatus for simulating end user responses to spam email messages", by Khalsa, et al., filed on May 11, 2005.

Gaskin, J.E., "Don't get spammed", Information Week, Aug. 18, 1997, retrieved from Internet: http://www.informationweek.com/644/44olspm.htm, 9 pages.

Ranum, et al.; "Implementing a generalized tool for network monitoring"; Proceedings of the 11th Systems Administration Conference; San Diego, CA; Oct. 26-31, 1997; pp. 1-8.

U.S. Appl. No. 10/949,465, entitled "System and method for filtering fraudulent email messages", by Bruno, et al., filed on Sep. 24, 2004.

* cited by examiner

METHOD, SYSTEM, AND COMPUTER PROGRAM PRODUCT FOR SECURITY WITHIN A GLOBAL COMPUTER NETWORK

CLAIM TO EARLIER APPLICATION

This application claims priority to coassigned U.S. Provisional Patent Application No. 60/433,345, filed Dec. 13, 2002, entitled METHOD AND APPARATUS FOR PROTECTING ONLINE USERS FROM SPOOF SITES USED TO PERFORM ONLINE IDENTITY THEFT AND FRAUD, naming Alagna et al. as inventors, which is incorporated herein by reference in its entirety.

BACKGROUND

This description relates in general to information handling systems, and in particular to a method, system, and computer program product for security within a global computer network. In a global computer network, a user may be deceived into relying on a resource that is misrepresented as a trusted resource. Such deception causes various problems, including potential damage to goodwill of the trusted resources.

SUMMARY

In a first embodiment, an information handling system determines whether a resource is likely misrepresented as a trusted resource within a global computer network. In a second embodiment, the information handling system outputs an indication of whether a resource within a global computer network is recognized as a known trusted resource.

A principal advantage of these embodiments is that deception is less likely.

BRIEF DESCRIPTION OF THE DRAWING

FIG. 9 is an illustration of a 1st screen displayed by a display device of a customer of FIG. 1.

FIG. 11a is an illustration of a 3rd screen displayed by a display device of a customer of FIG. 1.

FIG. 11b is an illustration of a 4th screen displayed by a display device of a customer of FIG. 1.

DETAILED DESCRIPTION

Figure 1:
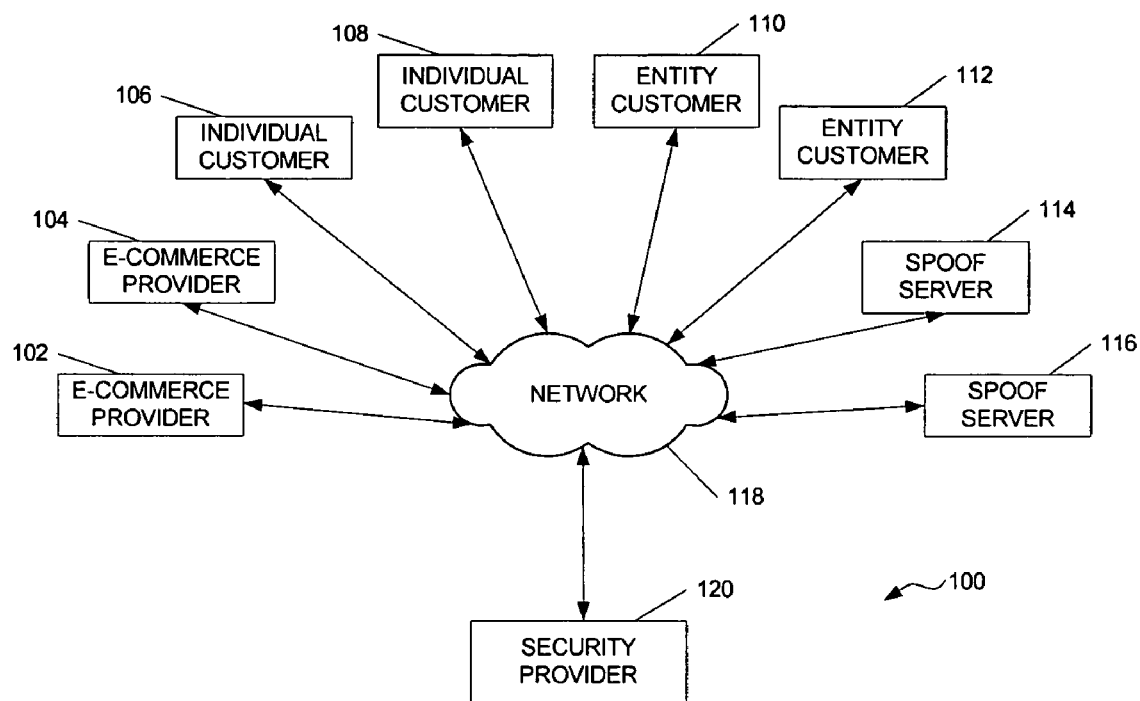
FIG. 1 is a block diagram of a system according to the illustrative embodiment.

FIG. 1 is a block diagram of a system, indicated generally at 100 according to the illustrative embodiment. System 100 includes (a) electronic commerce ("e-commerce") providers 102 and 104 for executing respective e-commerce provider processes as discussed further hereinbelow in connection with FIGS. 3 and 13-16, (b) individual customers 106 and 108 for executing respective individual customer processes as discussed further hereinbelow in connection with FIGS. 7, 9-12, 19 and 20, (c) entity customers 110 and 112 for executing respective entity customer process as discussed further hereinbelow in connection with FIGS. 7, 9-12, 19 and 20, and (d) security provider 120 for executing respective security provider processes as discussed further hereinbelow in connection with FIGS. 4, 5, 17 and 18. Further, system 100 includes spoof servers 114 and 116, and a global computer network 118 (e.g., a Transport Control Protocol/Internet Protocol ("TCP/IP") network, such as the Internet), which are discussed further hereinbelow.

Each of e-commerce providers 102 and 104, individual customers 106 and 108, entity customers 110 and 112, spoof servers 114 and 116, and security provider 120 includes a respective network interface for communicating with network 118 (e.g., outputting information to, and receiving information from, network 118), such as by transferring information (e.g., instructions, data, signals) between such e-commerce provider, individual customer, entity customer, spoof server and network 118. Also, each of e-commerce providers 102 and 104, individual customers 106 and 108, entity customers 110 and 112, spoof servers 114 and 116, network 118, and security provider 120 is a computing system that includes at least one respective information handling system ("IHS") (e.g., computer) for executing respective processes and performing respective operations (e.g., processing and communicating information) in response thereto as discussed further hereinbelow. Each such computing system and IHS is formed by various electronic circuitry means. Moreover, as shown in FIG. 1, all such IHS's are coupled to one another. Accordingly, e-commerce providers 102 and 104, individual customers 106 and 108, entity customers 110 and 112, spoof servers 114 and 116, and security provider 120 operate within the network 118.

For clarity, FIG. 1 depicts only two e-commerce providers 102 and 104, although system 100 may include additional e-commerce providers which are substantially identical to one another. Similarly for clarity, FIG. 1 depicts only two individual customers 106 and 108, although system 100 may include additional individual customers which are substantially identical to one another. Likewise, for clarity, FIG. 1 depicts only two entity customers 110 and 112, although system 100 may include additional entity customers which are substantially identical to one another. Moreover, for clarity, FIG. 1 depicts only two spoof servers, although system 100 may include additional spoof servers which are substantially identical to one another. E-commerce provider 102 is a representative one of the e-commerce providers, individual customer 106 is a representative one of the individual customers, entity customer 110 is a representative one of the entity customers, and spoof server 114 is a representative one of the spoof servers.

In system 100, any one or more of the e-commerce providers, customers, and/or security provider is equipped to determine whether a resource (e.g., a source or destination of information) is likely misrepresented as a trusted resource within the network 118, so that a user thereof is less likely to be deceived into relying on the misrepresented resource. For example, such deception may occur if a user selects (e.g., "clicks") on an embedded hyperlink to a web page, under a mistaken belief that the hyperlink will direct the user to a trusted web page, where instead the hyperlink actually directs the user to a misrepresented web page whose objective is to illegally, immorally or unethically deceive the user. Such a link is presentable (e.g., displayable) to the user in an electronic message (e.g., an electronic mail ("e-mail") message or an instant "chat" message). Moreover, a source (e.g., e-mail address) of such electronic message may likewise be misrepresented as a trusted resource.

A misrepresented web page may include features that simulate or mimic features of a trusted web page (e.g., by including the trusted web page's service mark, trademark, logo, layout and/or other elements). Such misrepresentation is a security risk. For example, the misrepresented web page may deceive a user into sharing confidential information (e.g., personal identification number ("PIN") or other password), sensitive information (e.g., social security number or other user identification), or financial information (e.g., credit card account information or bank account information), which compromises security. Such deception is a type of web page "spoofing."

After a user is deceived into visiting a misrepresented web page (e.g., "spoof web page"), the user is potentially subject to various types of attacks. In one example, the misrepresented web page displays an information entry field, which is embedded in the misrepresented web page, and which asks the user to enter confidential, sensitive, or financial information. In response to such request, if the user enters and transmits such information via the information entry field (e.g., by clicking a button labeled "submit"), the information is output to the misrepresented resource, and security is compromised.

In another example, an electronic message includes (e.g., is embedded with) a mark-up language command (e.g., HyperText mark up language ("HTML") command or Extensible Markup Language ("XML") command). Similar to a misrepresented web page, an electronic message may be misrepresented as originating from a trusted source (e.g., eBay, Microsoft). After a user receives and opens the electronic message, the user is potentially subject to various types of attacks. In one example, the electronic message displays an information entry field, which is embedded in the electronic message, and which asks the user to enter confidential, sensitive, or financial information. In response to such request, if the user enters and transmits such information via the information entry field (e.g., by clicking a button labeled "submit"), the information is output to the misrepresented resource, and security is compromised.

Figure 2:
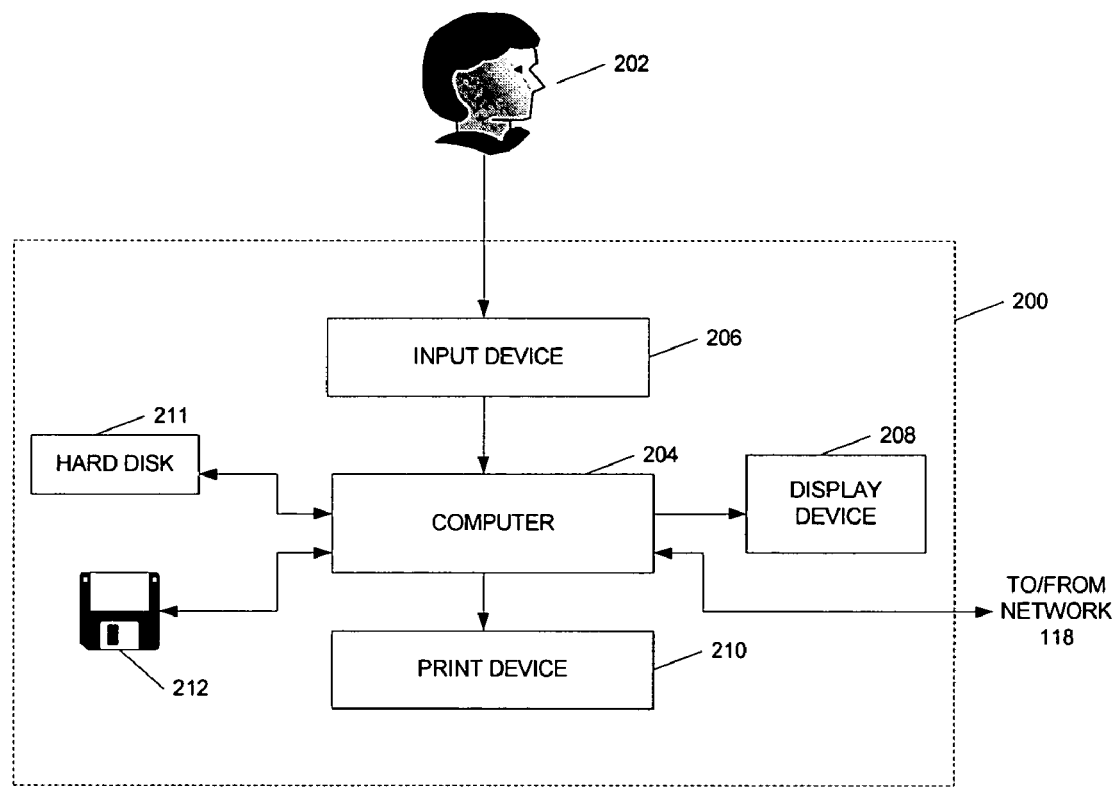
FIG. 2 is a block diagram of a representative computing system of FIG. 1.

FIG. 2 is a block diagram of a representative one of the computing systems of e-commerce providers 102 and 104, individual customers 106 and 108, entity customers 110 and 112, spoof servers 114 and 116, and security provider 120 of FIG. 1. Such representative computing system is indicated by dashed enclosure 200. Each of the computing systems of e-commerce providers 102 and 104, individual customers 106 and 108, entity customers 110 and 112, spoof servers 114 and 116, and security provider 120 operates in association with a respective human user. Accordingly, in the example of FIG. 2, computing system 200 operates in association with a human user 202, as discussed further hereinbelow.

As shown in FIG. 2, computing system 200 includes (a) input devices 206 for receiving information from human user 202, (b) a display device 208 (e.g., a conventional electronic cathode ray tube ("CRT") device) for displaying information to user 202, (c) a computer 204 for executing and otherwise processing instructions, (d) a print device 210 (e.g., a conventional electronic printer or plotter), (e) a nonvolatile storage device 211 (e.g., a hard disk drive or other computer-readable medium (or apparatus), as discussed further hereinbelow) for storing information, (f) a computer-readable medium (or apparatus) 212 (e.g., a portable floppy diskette) for storing information, and (g) various other electronic circuitry for performing other operations of computing system 200.

For example, computer 204 includes (a) a network interface (e.g., circuitry) for communicating between computer 204 and network 112 and (b) a memory device (e.g., random access memory ("RAM") device and read only memory ("ROM") device) for storing information (e.g., instructions executed by computer 204 and data operated upon by computer 204 in response to such instructions). Accordingly, computer 204 is connected to network 112, input devices 206, display device 208, print device 210, storage device 211, and computer-readable medium 212, as shown in FIG. 2. Also, computer 204 includes internal speakers for outputting audio signals. In an alternative embodiment, the speakers are external to computer 204.

For example, in response to signals from computer 204, display device 208 displays visual images, and user 202 views such visual images. Moreover, user 202 operates input devices 206 in order to output information to computer 204, and computer 204 receives such information from input devices 206. Also, in response to signals from computer 204, print device 210 prints visual images on paper, and user 202 views such visual images.

Input devices 206 include, for example, a conventional electronic keyboard and a pointing device such as a conventional electronic "mouse", rollerball or light pen. User 202 operates the keyboard to output alphanumeric text information to computer 204, and computer 204 receives such alphanumeric text information from the keyboard. User 202 operates the pointing device to output cursor-control information to computer 204, and computer 204 receives such cursor-control information from the pointing device.

Figure 3:
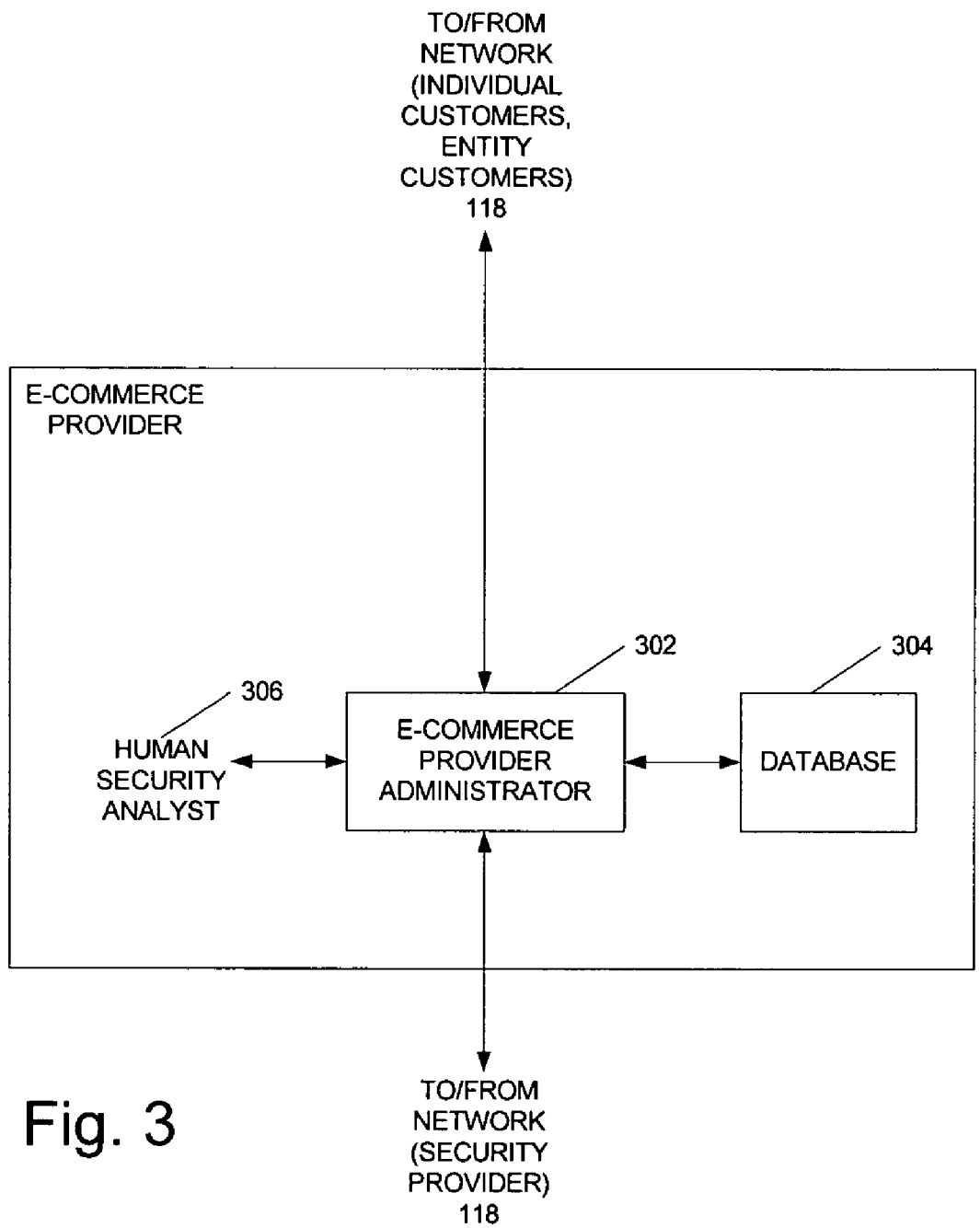
FIG. 3 is a block diagram of an e-commerce provider of FIG. 1.

FIG. 3 is a block diagram of e-commerce provider 102. E-commerce provider 102 performs e-commerce transactions (e.g., transactions of goods or services through network 118) with individual customers (e.g., individual customer 108) and entity customers (e.g., entity customer 110). E-commerce provider 102 includes an e-commerce provider administrator 302, which is a computing system for executing e-commerce provider administrator processes as discussed further hereinbelow in connection with FIGS. 13-16. Human security analyst 306 is a user of e-commerce provider administrator 302, similar to the manner in which human user 202 operates in association with computing system 200. E-commerce provider administrator 302 further operates in association with a database 304, which is stored within a hard disk of e-commerce provider administrator 302.

Within database 304, e-commerce provider administrator 302 stores results of various analyses performed by and received from security provider administrator 402 (discussed further hereinbelow in connection with FIG. 4). Database 304 is organized to include various addresses (e.g., Internet addresses) of web pages and analyses thereof. For example, such analyses include designations of whether such web pages (e.g., as represented by such addresses) are trusted resources, mistrusted resources, or neither (e.g., neutral).

Moreover, as shown in FIG. 3, e-commerce provider administrator 302 includes respective network interfaces for communicating with network 118 on behalf of e-commerce provider 102. Such communication includes outputting information to (and receiving information from) individual customers (e.g., individual customer 106) and entity customers (e.g., entity customer 110). Also, such communication with network 118 also includes outputting information to (and receiving information from) security provider 120.

Figure 4:
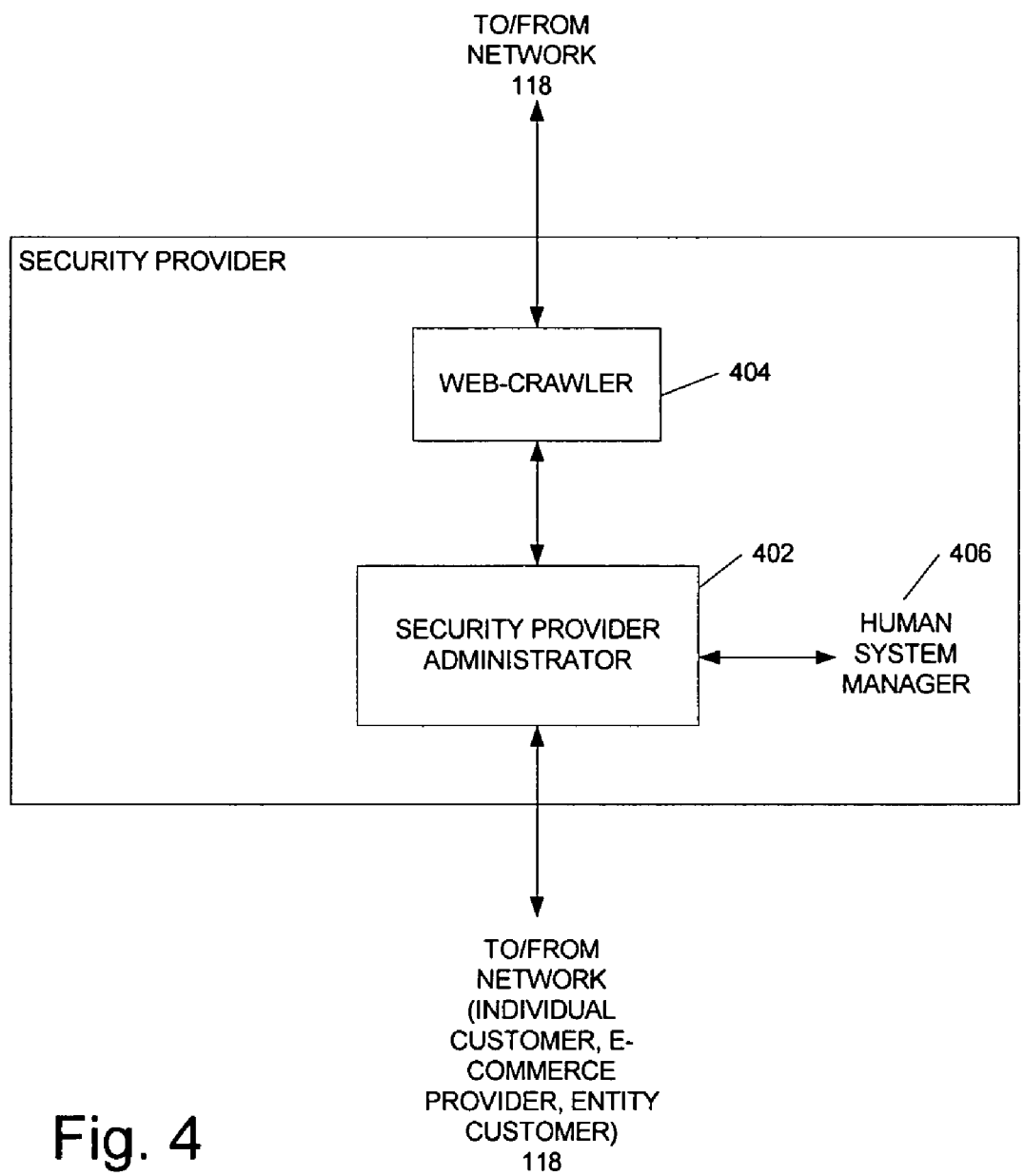
FIG. 4 is a block diagram of a security provider of FIG. 1.

FIG. 4 is a block diagram of security provider 120. Security provider 120 includes security provider administrator 402, which is a computing system for executing security provider administrator processes as discussed further hereinbelow in connection with FIGS. 5, 17 and 18. Human system manager 406 is a user of security provider administrator 402, similar to the manner in which human user 202 operates in association with computing system 200.

Also as shown in FIG. 4, in the illustrative embodiment, security provider administrator 402 includes respective network interfaces for communicating with network 118 on behalf of security provider 120. Such communication includes outputting information to (and receiving information from) e-commerce providers (e.g., e-commerce provider 102), individual customers (e.g., individual customer 106), and entity customers (e.g., entity customer 110).

Moreover, security provider 120 includes a web-crawler 404, which is a computing system for executing a web-crawling process as discussed hereinbelow. Web-crawler 404 is coupled to security provider administrator 402 via a connection for communicating with security provider administrator 402. Also, as shown in FIG. 4, web-crawler 404 includes a respective network interface for communicating with network 118, such as by transferring information between web-crawler 404 and network 118.

From security provider administrator 402, web-crawler 404 receives an Internet address associated with a web page from which to begin a search operation. Web-crawler 404 automatically retrieves a web page from such Internet address and searches the web page for other Internet addresses that are listed therein. Web-crawler 404 automatically retrieves the web pages associated with such other Internet addresses and likewise continues searching those web pages for other Internet addresses that are listed therein. Web-crawler 404 continues operating in this manner until it determines that a halting condition has occurred. For example, the halting condition includes a specified one or more of the following: reaching a maximum word limit, or reaching a maximum document limit. To security provider administrator 402, web crawler 404 outputs the Internet addresses that it identifies during the process.

Figure 5:
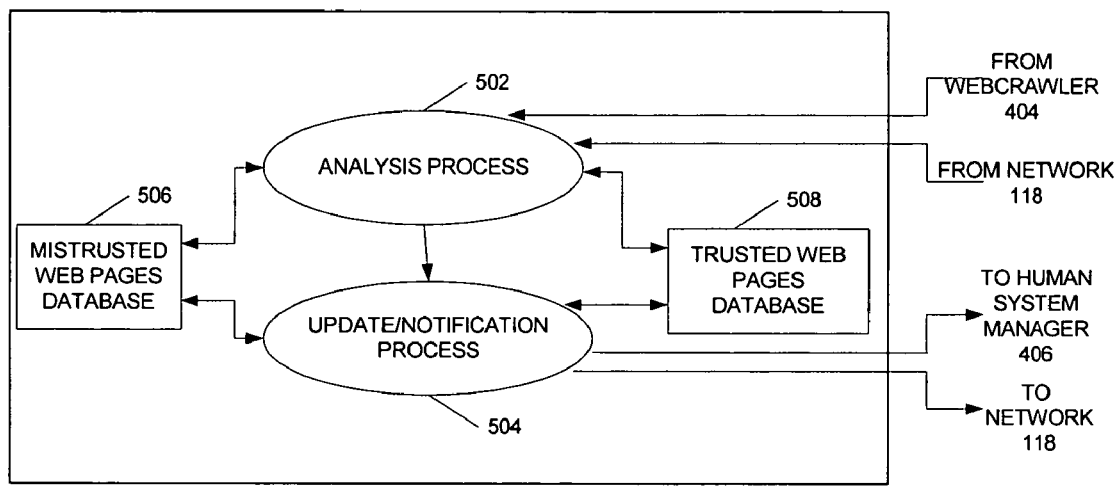
FIG. 5 is a conceptual illustration of various processes executed by a security provider administrator of FIG. 4.

FIG. 5 is a conceptual illustration of various processes executed by security provider administrator 402, which are discussed in more detail herein. As shown in FIG. 5, security provider administrator 402 executes an analysis process 502 (discussed further hereinbelow in connection with FIG. 17) and an update/notification process 504 (discussed further hereinbelow in connection with FIG. 18). Such processes perform their respective operations in response to information stored in a mistrusted web pages database 506 and a trusted web pages database 508.

Mistrusted web pages database 506 and trusted web pages database 508 are stored within a hard disk of security provider administrator 402. Within mistrusted web pages database 506 and trusted web pages database 508, security provider administrator 402 stores records of operations performed by security provider administrator 120, including records of analyses performed by analysis process 502. Mistrusted web pages database 506 includes a list of Internet addresses that are associated with respective web pages (e.g., "spoof web pages") known to be misrepresented as trusted web pages. Conversely, organization of trusted web pages database 508 includes a list of Internet addresses that are associated with respective web pages known to be trusted.

In the illustrative embodiment, a human system manager (e.g., human system manager 406) initially populates trusted web pages database 508. In an alternative embodiment, a computing system (e.g., security provider administrator 402) executes a process (e.g., a "spider") to initially populate trusted web pages database 508. In such an alternative embodiment, the computing system automatically retrieves various web pages, and it stores (in trusted web pages database 508) the Internet address of web pages that satisfy predetermined criteria indicating that such web pages are trusted.

Analysis process 502 analyzes information received by security provider administrator 120 from web-crawler 404 and from network 118. Also, analysis process 502 outputs suitable information to update/notification process 504.

Update/notification process 504 performs other operations of security provider administrator 120, including communication of information (a) between human system manager 406 and network 118 and (b) via network 118, to customers (e.g., customers 106 and 110) and e-commerce providers (e.g., e-commerce provider 102) regarding analyses of electronic messages and web pages retrieved from network 118.

Figure 6:
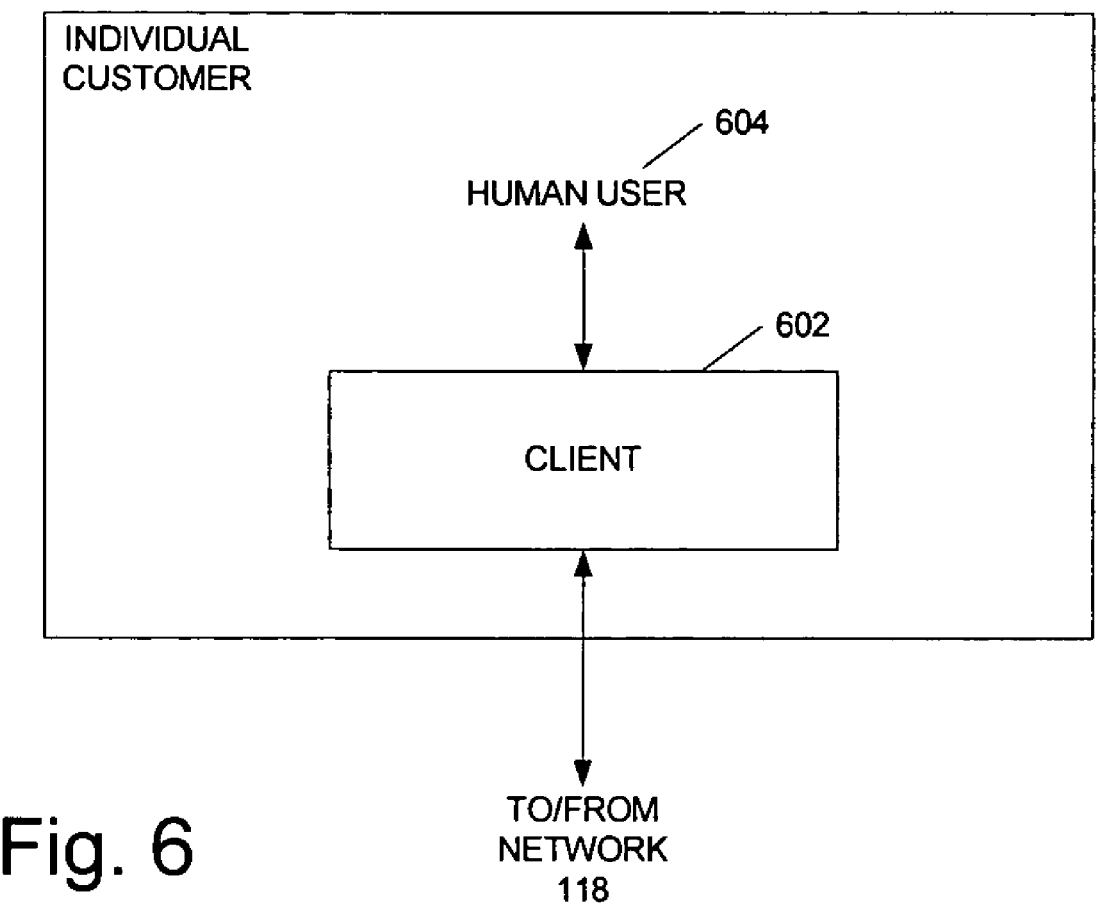
FIG. 6 is a block diagram of an individual customer of FIG. 1.

FIG. 6 is a block diagram of individual customer 106. Individual customer 106 includes a client 602 for executing client processes as discussed further hereinbelow in connection with FIGS. 7, 9-12, 19 and 20. Human user 604 is a user of client 602, similar to the manner in which human user 202 operates in association with computing system 200. Moreover, client 602 includes a network interface for communicating with network 118.

Figure 7:
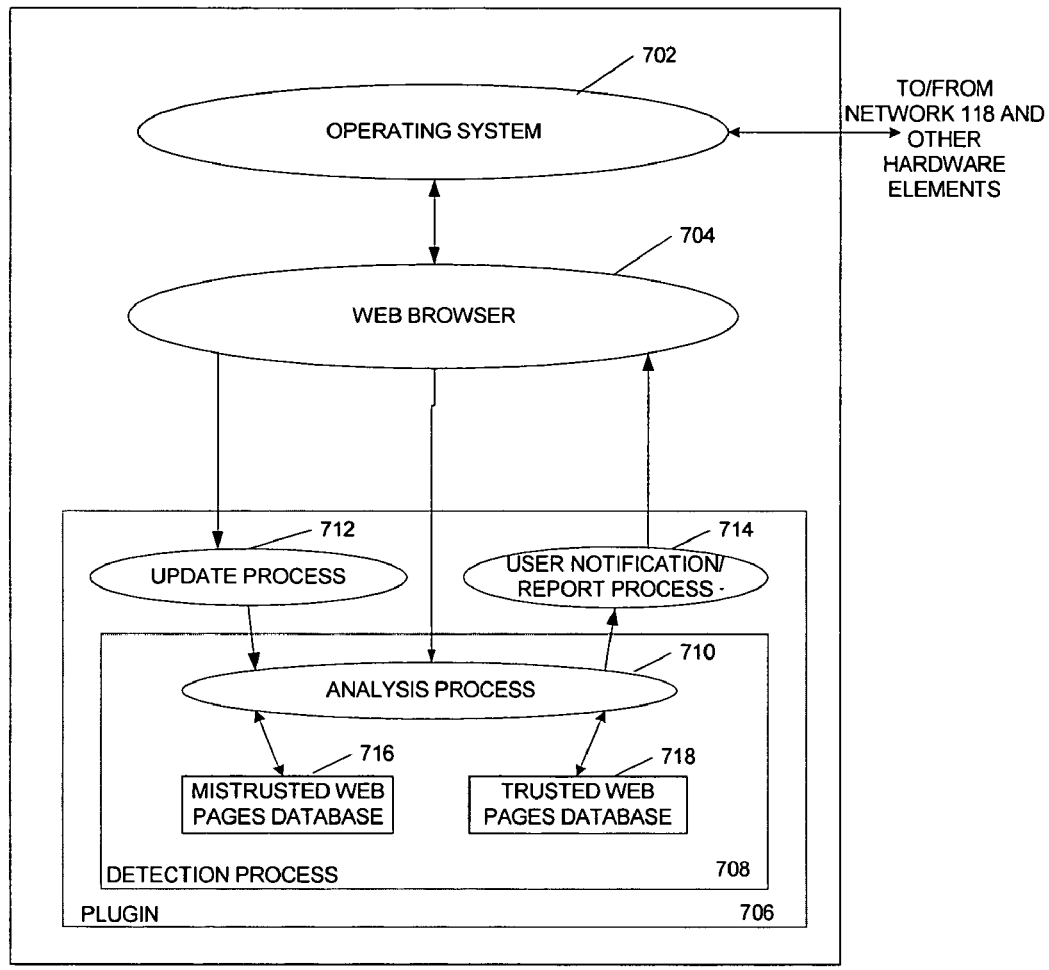
FIG. 7 is a conceptual illustration of various processes executed by a customer of FIG. 1.

FIG. 7 is a conceptual illustration of various processes executed by representative clients 602 and 804. In the operation of FIG. 7, client 602 is a representative one of clients 602 and 804. The processes executed by client 602 are discussed in more detail elsewhere herein.

As shown in FIG. 7, client 602 executes an operating system 702, a web browser 704, and a plug-in indicated by dashed enclosure 706. Also, plug-in 706 includes a detection process indicated by dashed enclosure 708, an update process 712, and a user notification/report process 714 (discussed in more detail hereinbelow in connection with FIG. 20). Detection process 708 includes an analysis process 710 (discussed in more detail hereinbelow in connection with FIG. 19), which writes information to mistrusted web pages database 716 and trusted web pages database 718 for storage therein, and which operates in response thereto. Databases 716 and 718 are stored within a hard disk of client 602.

Operating system 702 is a Microsoft Windows operating system or, alternatively, any other suitable operating system software, which performs conventional operating system operations. Operating system 702 communicates between web browser 704 and various elements of client 602.

Web browser 704 is a Microsoft Internet Explorer browser or, alternatively, any other suitable web browser software, which performs conventional web browser operations. Web browser 704 outputs information to analysis process 710 directly, and indirectly via update process 712. Also, web browser 704 receives information from analysis process 710 via user notification/report process 714.

Figure 8:
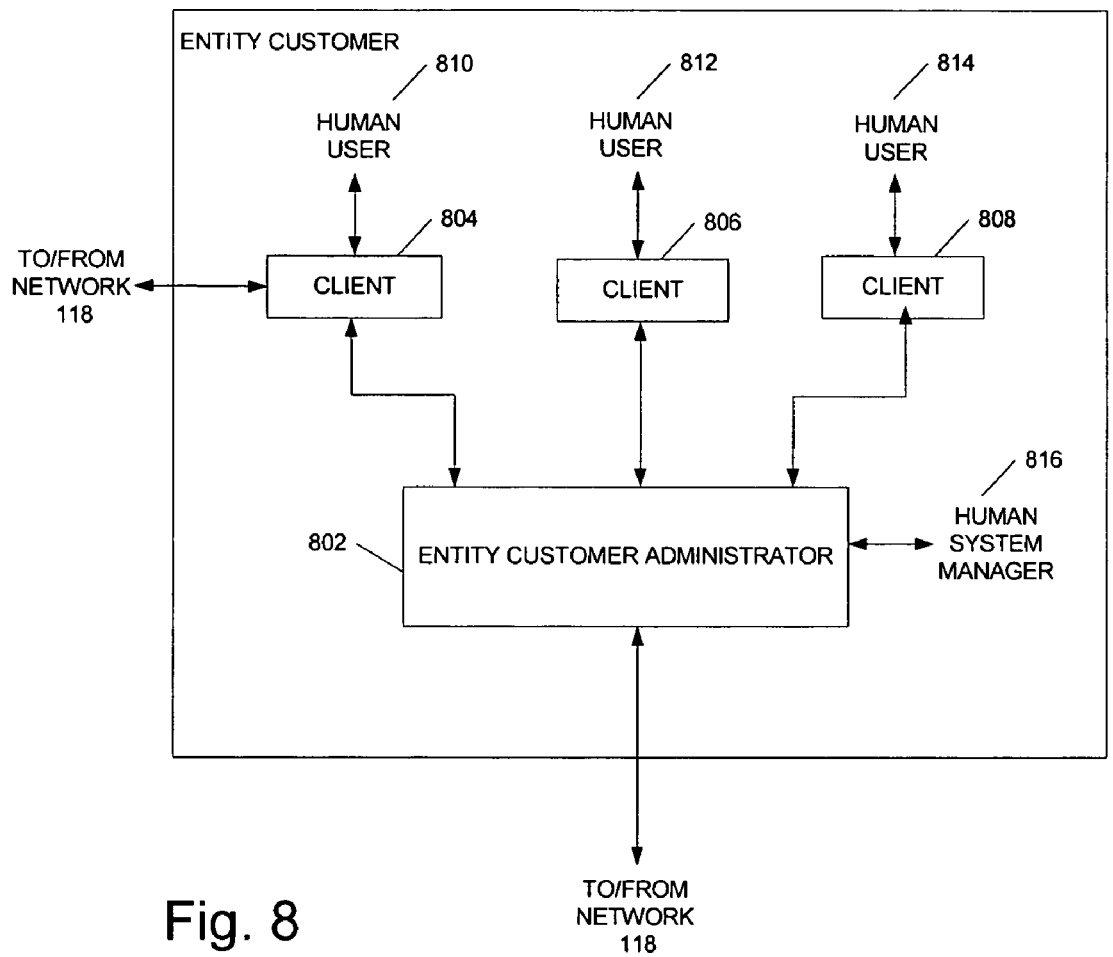
FIG. 8 is a block diagram of an entity customer of FIG. 1.

FIG. 8 is a block diagram of entity customer 110. Entity customer 110 includes clients 804, 806, and 808, each for executing respective client processes as discussed hereinabove in connection with FIG. 7, and each includes a respective network interface for communicating with network 118. For clarity, FIG. 8 shows a connection between client 804 and network 118, but clients 806 and 808 are likewise connected to network 118

Human users 810, 812, and 814 are respective users of clients 804, 806, and 808, similar to the manner in which computing system 200 operates in association with user 202. Further, entity customer 110 includes an entity customer administrator 802, which is a computing system for executing entity customer administrator processes as discussed elsewhere herein. Human system manager 816 is a user of entity customer administrator 802.

Moreover, entity customer administrator 802 includes a network interface for communicating with network 118. As shown in FIG. 8, entity customer administrator 802 is coupled to each of clients 804, 806, and 808, and they communicate information between one another.

In the discussion hereinbelow, client 804 is a representative one of clients 804, 806, and 808. Although FIG. 8 shows only three clients (i.e., clients 804, 806, and 808), it should be understood that other clients (substantially identical to clients 804, 806, and 808), are likewise coupled to entity customer administrator 802. Each of such other clients operates in association with a respective human user, similar to the manner in which client 804 operates with user 810. In an alternative embodiment, one or more of clients 804, 806, and 808 perform the operation of entity customer administrator 802.

Figure 9:
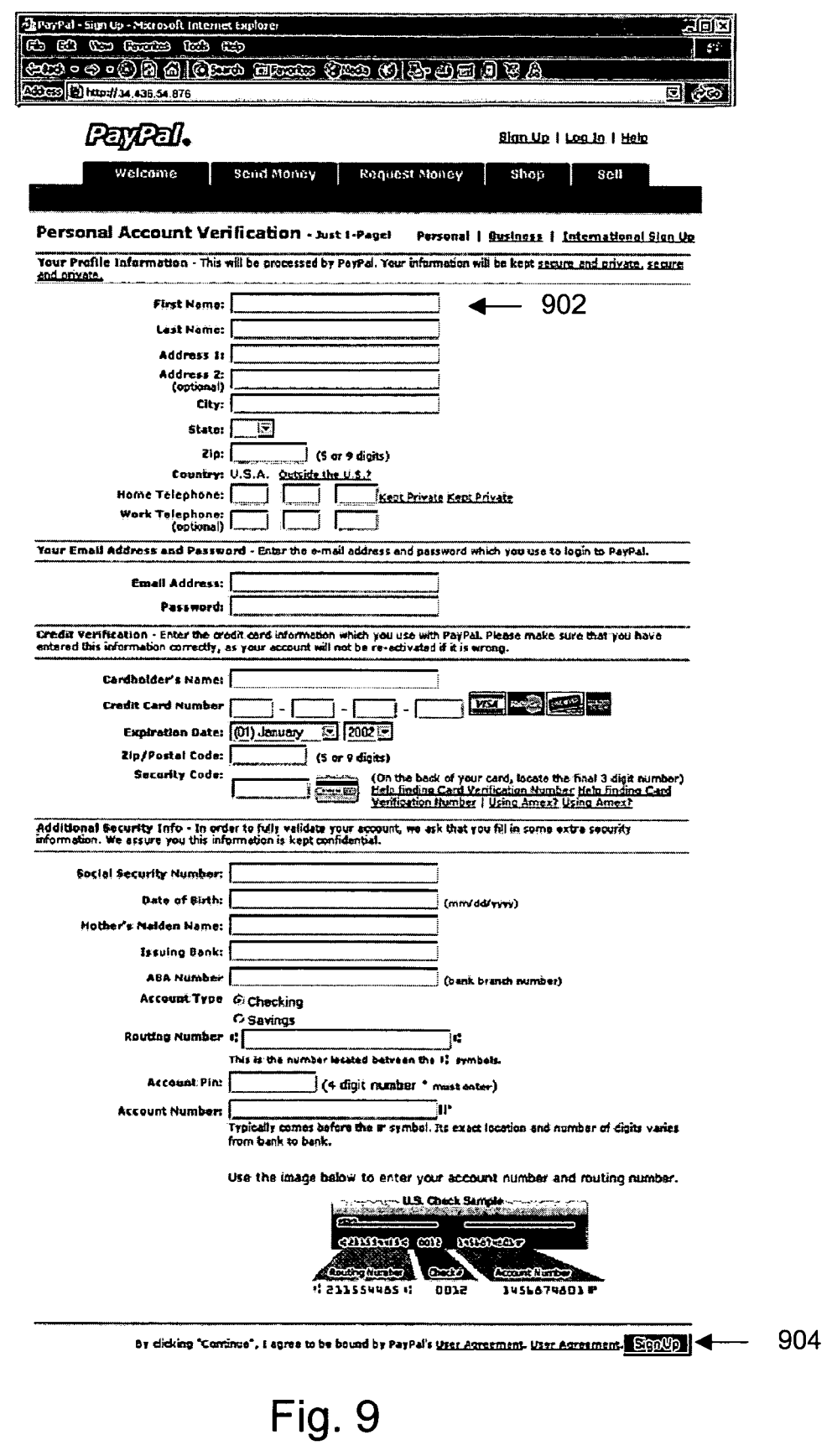

FIG. 9 is an illustration of a visual image (e.g., "screen"), indicated generally at 900, displayed by a display device (e.g., display device 208) of a client (e.g., client 602) of an individual customer (e.g., individual customer 106) or a client (e.g., client 804) of an entity customer (e.g., entity customer 110). Screen 900 is an example screen of a "spoof" web page resource that is misrepresented as a trusted web page resource within a global computer network. The "spoof" web page is output by a spoof server (e.g., spoof server 114).

Screen 900 includes a set of information entry fields ("fields") indicated generally at 902. As shown in FIG. 9, fields 902 are regions of screen 900 in which a client's user is asked to specify alphanumeric character information. More particularly, in fields 902, the client's user is asked to specify the following information as shown in FIG. 9: first name, last name, address 1, address 2, city, state, zip, country, home telephone, work telephone, e-mail address, PayPal password, credit cardholder's name, credit card number, credit card expiration date, credit cardholder's zip/postal code, credit card security code, social security number, date of birth, mother's maiden name, credit card issuing bank, ABA number, account type, routing number, account pin, and account number.

Screen 900 includes a Sign Up "button" 904, which is a region of screen 900. Button 904 is selectable (e.g., "clickable") by the client's user and is associated with an Internet address of a spoof server (e.g., spoof server 114). In response to the client's user clicking button 904, the client's computer outputs information (specified in fields 902 by the client's user) to such addressed spoof server (e.g., spoof server 114) through network 118, and security is compromised.

Screen 900 is an example screen of a web page resource that is misrepresented by its content (e.g., information entry fields 902) as a trusted web page resource. In another example, a web page resource is misrepresented by an address in a different web page or in an electronic message (e.g., Internet hyperlink embedded in the different web page or in the electronic message), where the address's wording appears linked to a trusted web page resource, but instead the address is actually linked to a misrepresented web page resource.

Figure 10:
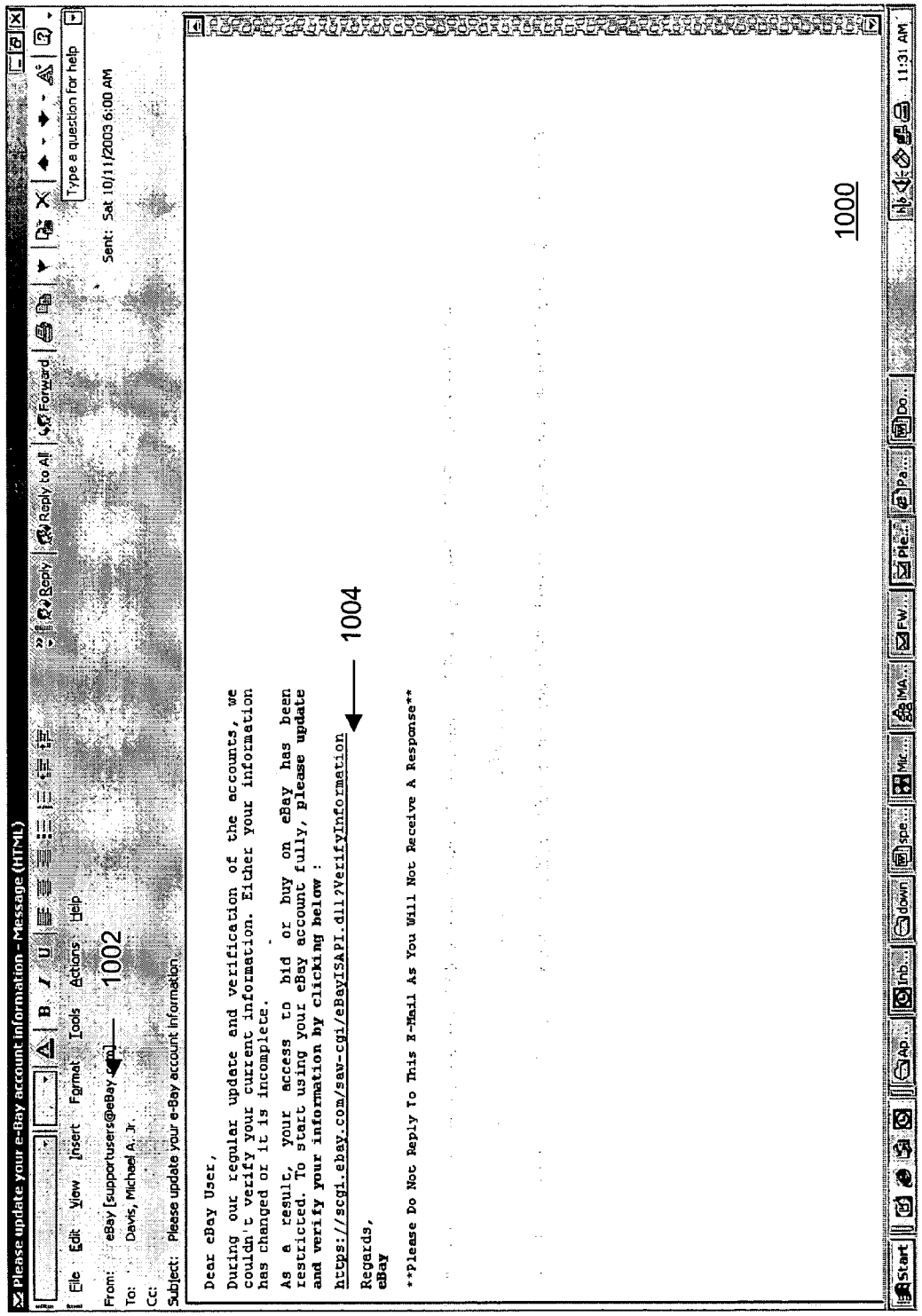
FIG. 10 is an illustration of a 2nd screen displayed by a display device of a customer of FIG. 1.

FIG. 10 is an illustration of another screen, indicated generally at 1000, displayed by the client's display device. Screen 1000 shows an electronic message, which includes content that misrepresents a web page resource as a trusted web page resource. Examples of an electronic message include electronic mail ("e-mail") messages and instant messages (e.g., "chat" messages).

In FIG. 10, the web page resource is misrepresented by: (a) a source address 1002 (e.g., return message address, such as "supportusers@eBay.com") in the header of the electronic message, where the address's wording appears linked to a trusted electronic message resource, but instead the address is actually linked to a misrepresented electronic message resource associated with a spoof server (e.g., spoof server 114) that is not approved by eBay.com; and/or (b) an address (e.g., Internet hyperlink) 1004 in the body of the electronic message, where the address's wording appears linked to a trusted web page resource, but instead the address is actually linked to a misrepresented web page resource that is not approved by eBay.com.

In response to the client's user "clicking" address 1004, (a) the client's computer outputs such address to network 118, (b) the address's linked spoof server outputs signals (e.g., HTML commands or XML commands) to the client's computer, and (c) the client's display device displays a screen (e.g., screen 900) of a spoof web page.

Figure 11A:
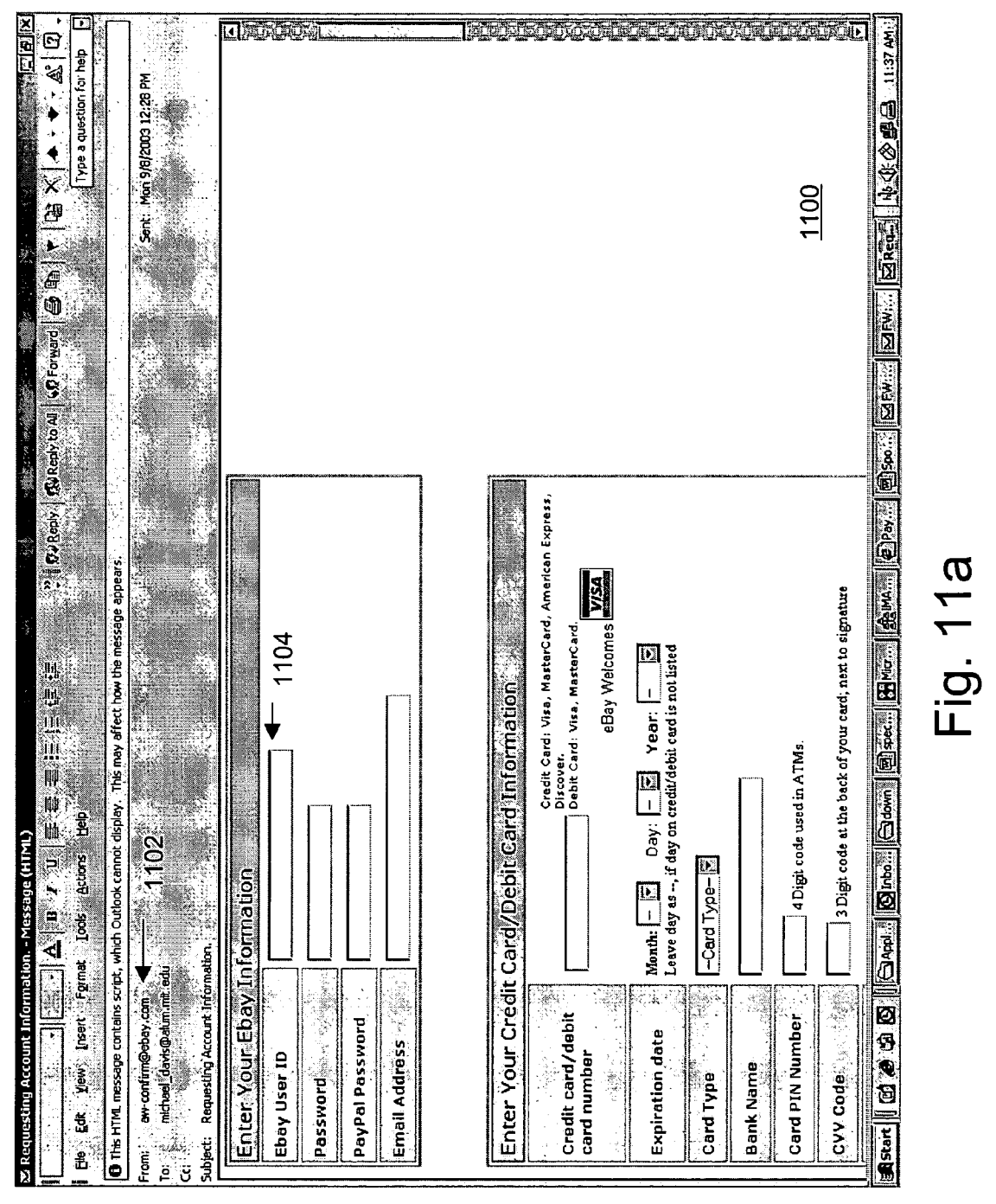
Figure 11B:
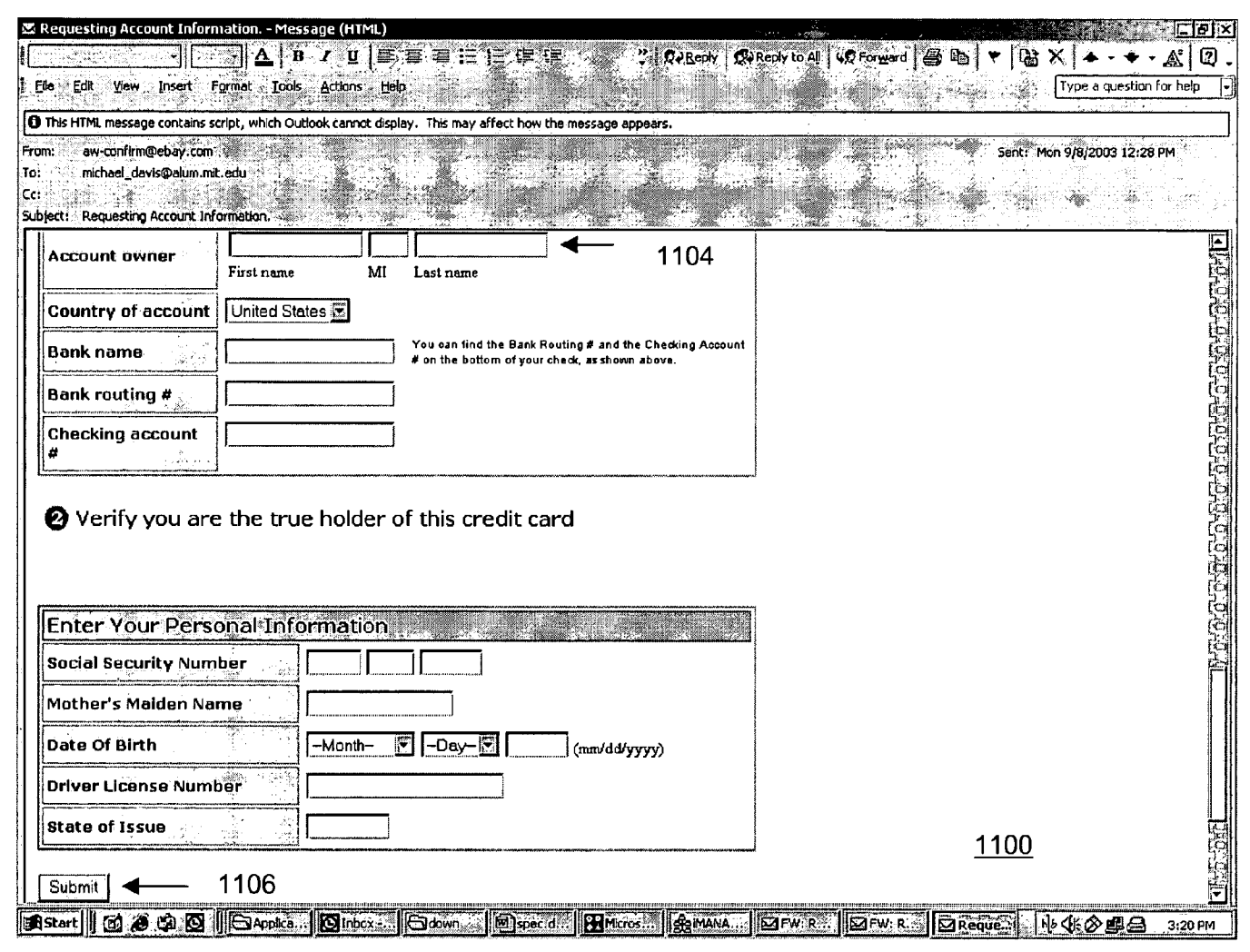

FIG. 11a and 11b are illustrations of a screen generally indicated at 1100, displayed by the client's display device. Screen 1100 shows an electronic message, which includes content that misrepresents a web page resource as a trusted web page resource. FIG. 11a depicts a first part of screen 1100, and FIG. 11b depicts a second part of screen 1100. Screen 1100 is an example of an e-mail message that includes markup language (e.g., HTML or XML) commands. The client's computing system processes the markup language commands and displays a screen according to such commands (e.g., screen 1100 of FIGS. 11a and 11b).

For example, screen 1100 includes information entry fields 1104. Similar to fields 902 of screen 900 (described hereinabove in connection with FIG. 9), fields 1104 are regions of screen 1100 in which the client's user is asked to specify alphanumeric character information. More particularly, in fields 1104, the client's user is asked to specify the following information as shown in FIG. 11a: (a) eBay user ID, (b) eBay password, (c) PayPal password, (d) e-mail address, (e) credit card/debit card number, (f) credit card/debit card expiration date, (g) credit card/debit card type, (h) credit card/debit card bank name, (i) credit card/debit card PIN number, and (j) credit card/debit card CVV code. Moreover, the client's user is asked to specify additional information in fields 1104 as shown in FIG. 11b, namely: (a) credit card/debit card account owner, (b) country of account, (c) bank name, (d) bank routing number, (e) checking account number, (f) social security number, (g) mother's maiden name, (h) date of birth, (i) driver's license number, and (j) state of driver's license issue.

In screen 1100, the web page resource is misrepresented by: (a) a source address 1102 (e.g., return message address, such as "aw-confirm@ebay.com") in the header of the electronic message, where the address's wording appears linked to a trusted electronic message resource, but instead the address is actually linked to a misrepresented electronic message resource associated with a spoof server (e.g., spoof server 114) that is not approved by eBay.com; and/or (b) wording and layout of the information entry fields 1104 in the body of the electronic message, where such wording and layout appear linked to a trusted web page resource, but instead the information entry fields 1104 are actually linked to a misrepresented web page resource that is not approved by eBay.com.

Screen 1100 includes a Submit button 1106, which is a region of screen 1100. Similar to button 904 (discussed hereinabove in connection with FIG. 9) of screen 900, button 1106 is selectable by the client's user and is associated with an Internet address of a spoof server (e.g., spoof server 114). In response to the client's user clicking button 1106, the client's computer outputs information (specified in fields 1104 by the client's user) to such addressed spoof server (e.g., spoof server 114) through network 118, and security is compromised.

Figure 12:
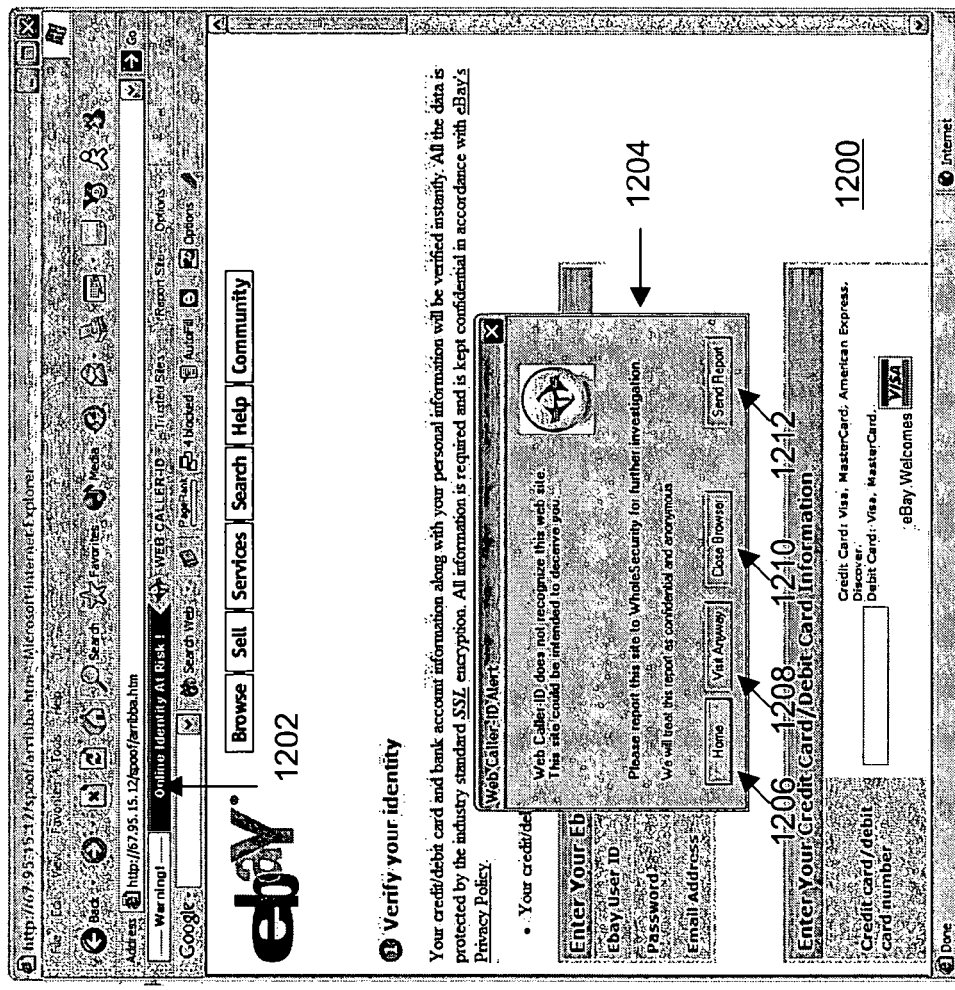
FIG. 12 is an illustration of a 5th screen displayed by a display device of a customer of FIG. 1.
Figure 13:
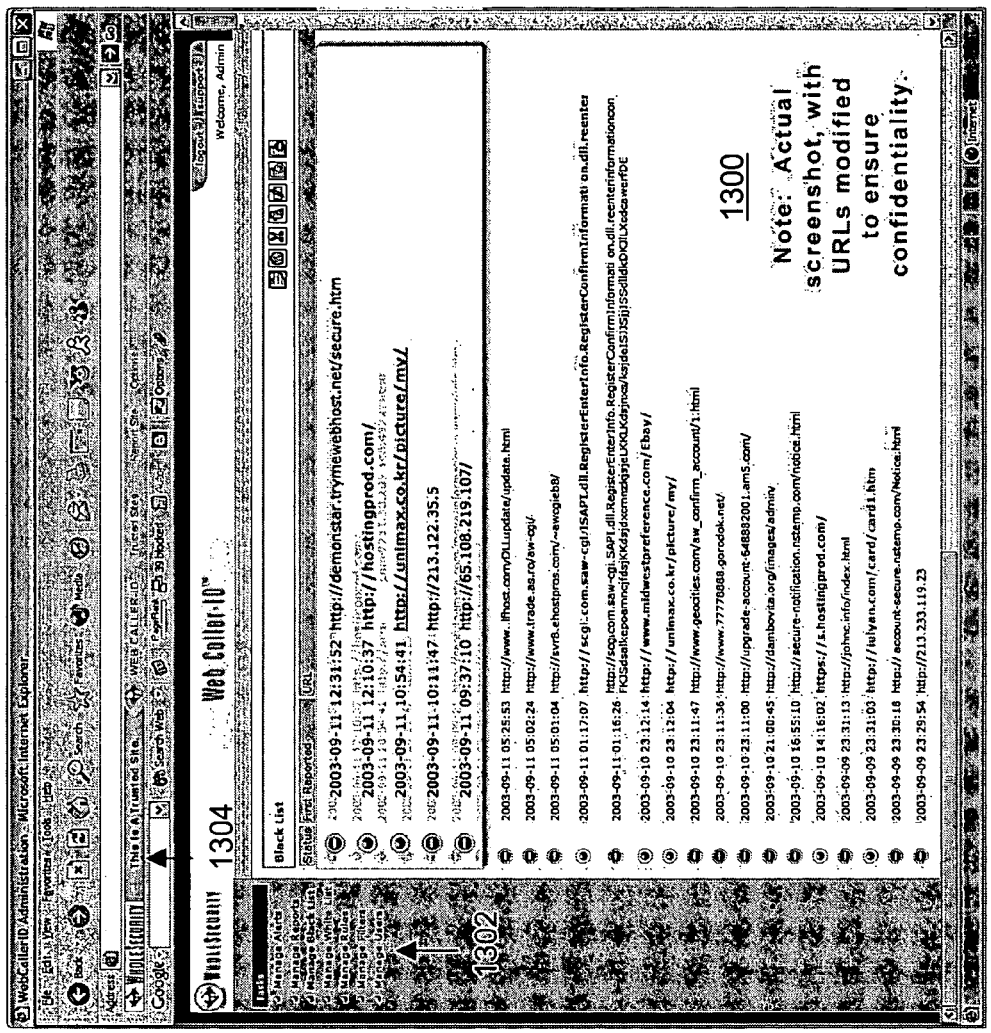
FIG. 13 is an illustration of a 1st screen displayed by a display device of an e-commerce provider of FIG. 1.
Figure 14:
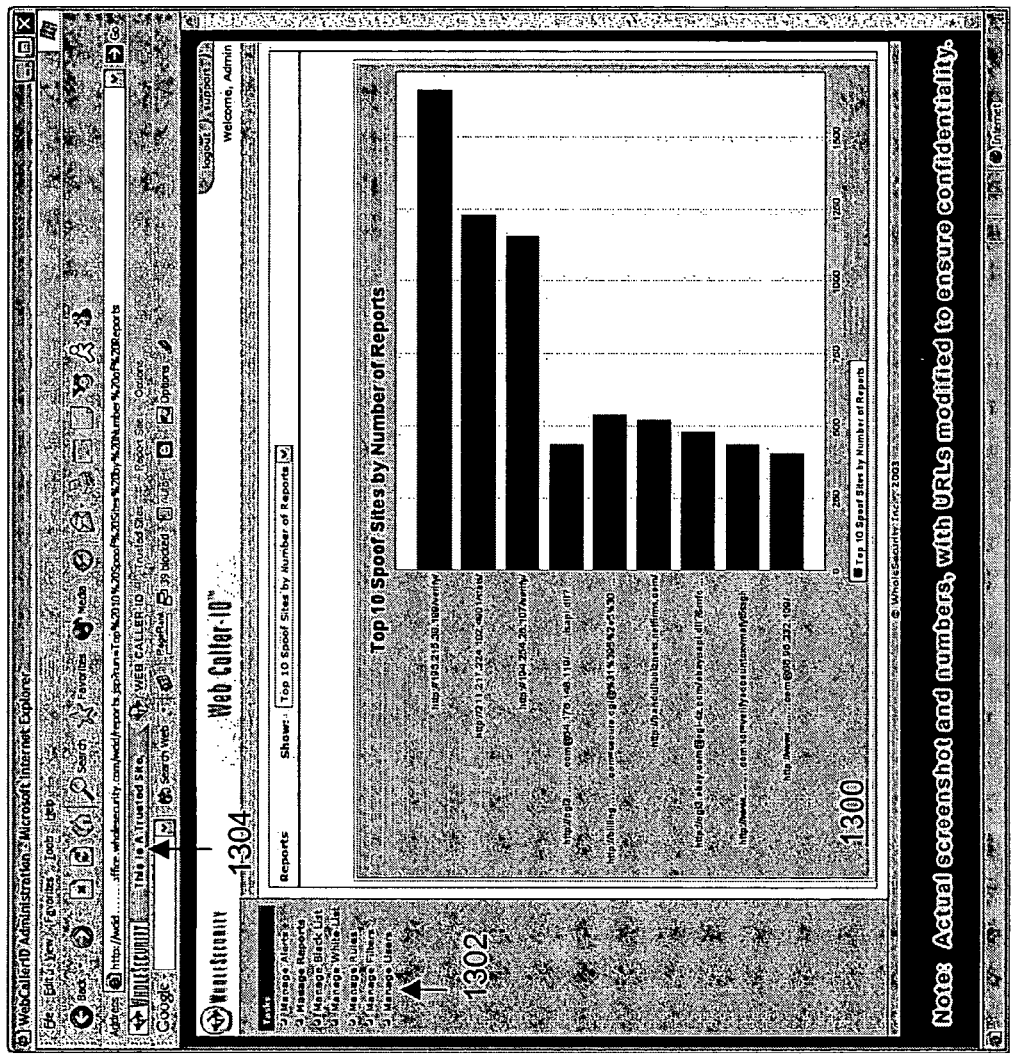
FIG. 14 is an illustration of a 2nd screen displayed by a display device of an e-commerce provider of FIG. 1.

FIG. 12 is an illustration of a screen indicated generally at 1200, displayed by the client's display device. Likewise, FIGS. 13 and 14 are illustrations of screens indicated generally at 1300, displayed by a display device of an e-commerce provider administrator (e.g., e-commerce provider administrator 302). FIGS. 12, 13, and 14 are discussed in more detail hereinbelow.

Figure 15:
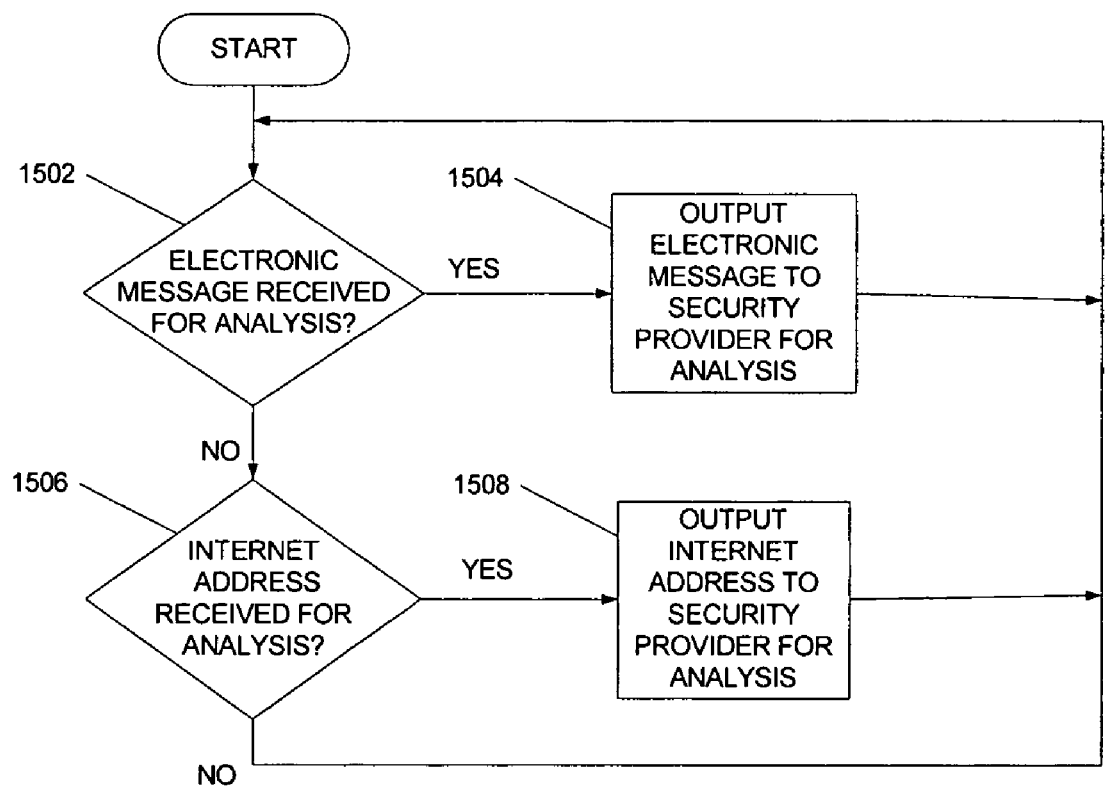
FIG. 15 is a flowchart of operation of a process executed by an e-commerce provider administrator of FIG. 3.

FIG. 15 is a flowchart of operation of a process executed by e-commerce provider administrator 302. The operation begins at a step 1502, where e-commerce provider administrator 302 determines whether it has received an electronic message for requested analysis (e.g., from individual customers or entity customers via network 118).

In the illustrative embodiment, e-commerce provider administrator 302 receives such an electronic message in response to a customer (e.g., individual customer 106 or entity customer 110) outputting the electronic message to e-commerce provider 102. Such an electronic message is output by such a customer in response to the customer's receiving the electronic message through network 118 and suspecting that the electronic message misrepresents a resource as a trusted resource (e.g., a web page).

At step 1502, if e-commerce provider administrator 302 determines that it has received an electronic message for analysis, the operation continues to a step 1504. At step 1504, e-commerce provider administrator 302 outputs the electronic message to security provider 120 through network 118 for analysis. After step 1504, the operation returns to step 1502.

Conversely, if e-commerce provider administrator 302 determines at step 1502 that it has not received an electronic message for analysis, the operation continues to a step 1506, where e-commerce provider administrator 302 determines whether it has received an Internet address for requested analysis (e.g., from individual customers or entity customers via network 118). E-commerce provider administrator 302 receives such an Internet address in response to a customer (e.g., individual customer 106 or entity customer 110) outputting the Internet address to e-commerce provider 102. Such an Internet address is output by such a customer in response to the customer's suspecting that the Internet address misrepresents a web page resource as a trusted web page resource.

At step 1506, if e-commerce provider administrator 302 determines that it has received an Internet address for analysis, the operation continues to a step 1508. At step 1508, e-commerce provider administrator 302 outputs the Internet address to security provider 120 through network 118 for analysis. After step 1508, the operation returns to step 1502. Conversely, if e-commerce provider administrator 302 determines at step 1506 that it has not received an Internet address for analysis, the operation returns to step 1502.

Figure 16:
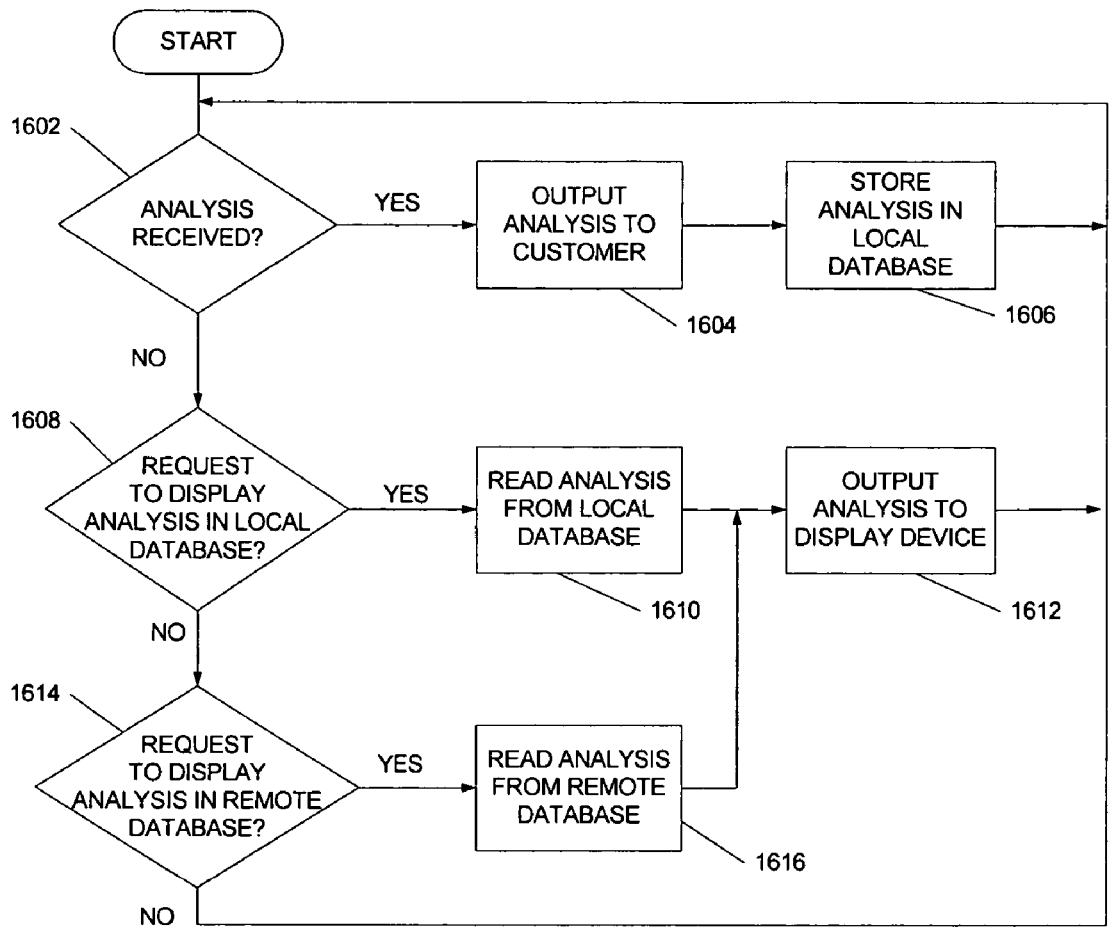
FIG. 16 is a flowchart of operation of another process executed by the e-commerce provider administrator of FIG. 3.

FIG. 16 is a flowchart of operation of another process of e-commerce provider administrator 302. The operation begins at a step 1602, where e-commerce provider administrator 302 determines whether it has received an analysis from security provider 120 through network 118. In response to e-commerce provider administrator 302 determining that it has received such an analysis, the operation continues to a step 1604.

At step 1604, e-commerce provider administrator 302 outputs the analysis to an individual customer or an entity customer through network 118 (e.g., the individual customer or entity customer from which e-commerce provider administrator 302 received the request for analysis). After step 1604, the operation continues to a step 1606, where e-commerce provider administrator 302 stores the analysis in its local database 304. After step 1606, the operation returns to step 1602.

At step 1602, if e-commerce provider administrator 302 determines that it has not received an analysis from security provider 120 through network 118, the operation continues to a step 1608. At step 1608, e-commerce provider administrator 302 determines whether it has received a request to display an analysis that is stored in database 304.

In response to e-commerce provider administrator 302 determining that such a request has been received, the operation continues to a step 1610. At step 1610, e-commerce provider administrator 302 reads the analysis from database 304. After step 1610, the operation continues to a step 1612, where e-commerce provider administrator 302 outputs the analysis to its display device for display to human security analyst 306 (e.g., which views the displayed analysis, such as screen 1300 of FIG. 13). After step 1612, the operation returns to step 1602. Referring again to step 1608, if e-commerce provider administrator 302 determines that it has not received a request to display an analysis that is stored in database 304, the operation continues to a step 1614. At step 1614, e-commerce provider administrator 302 determines whether it has received a request to display an analysis that is stored remotely in either the mistrusted web pages database 506 or the trusted web pages database 508. If so, the operation continues to a step 1616, where e-commerce provider administrator 302 reads the stored analysis from a suitable one of databases 506 and 508.

After step 1616, the operation continues to step 1612, where e-commerce provider administrator 302 outputs the analysis to its display device for display to human security analyst 306 (e.g., which views the displayed analysis, such as screen 1300 of FIG. 13). Conversely, at step 1614, if e-commerce provider administrator 302 determines that it has not received a request to display an analysis that is stored remotely in either database 506 or 508, the operation returns to step 1602.

As shown in FIG. 13, screen 1300 includes a set of links, indicated generally at 1302, which are regions of screen 1300 that are respectively selectable by the human security analyst 306 for causing the e-commerce provider administrator 302 to output various aspects of the analysis to the display device for viewing by the human security analyst 306. As shown in FIG. 13, the set of links 1302 includes links that are respectively selectable by the human security analyst 306 to (a) manage alerts, (b) manage reports, (c) manage a black list (e.g., known mistrusted web pages database 506), (d) manage a white list (e.g., known trusted web pages database 508), (e) manage rules, (f) manage filters, and (g) manage users.

In the example of FIG. 13, screen 1300 is output by e-commerce provider administrator 302 in response to human security analyst 306 clicking link 1302 to view and manage the known mistrusted web pages database 506. By comparison, in the example of FIG. 14, screen 1300 is output by e-commerce provider administrator 302 in response to human security analyst 306 clicking link 1302 to view and manage reports. As shown in FIGS. 13 and 14, screen 1300 also includes a tool bar 1304, which is substantially identical to a tool bar 1202 of FIG. 12.

Figure 17:
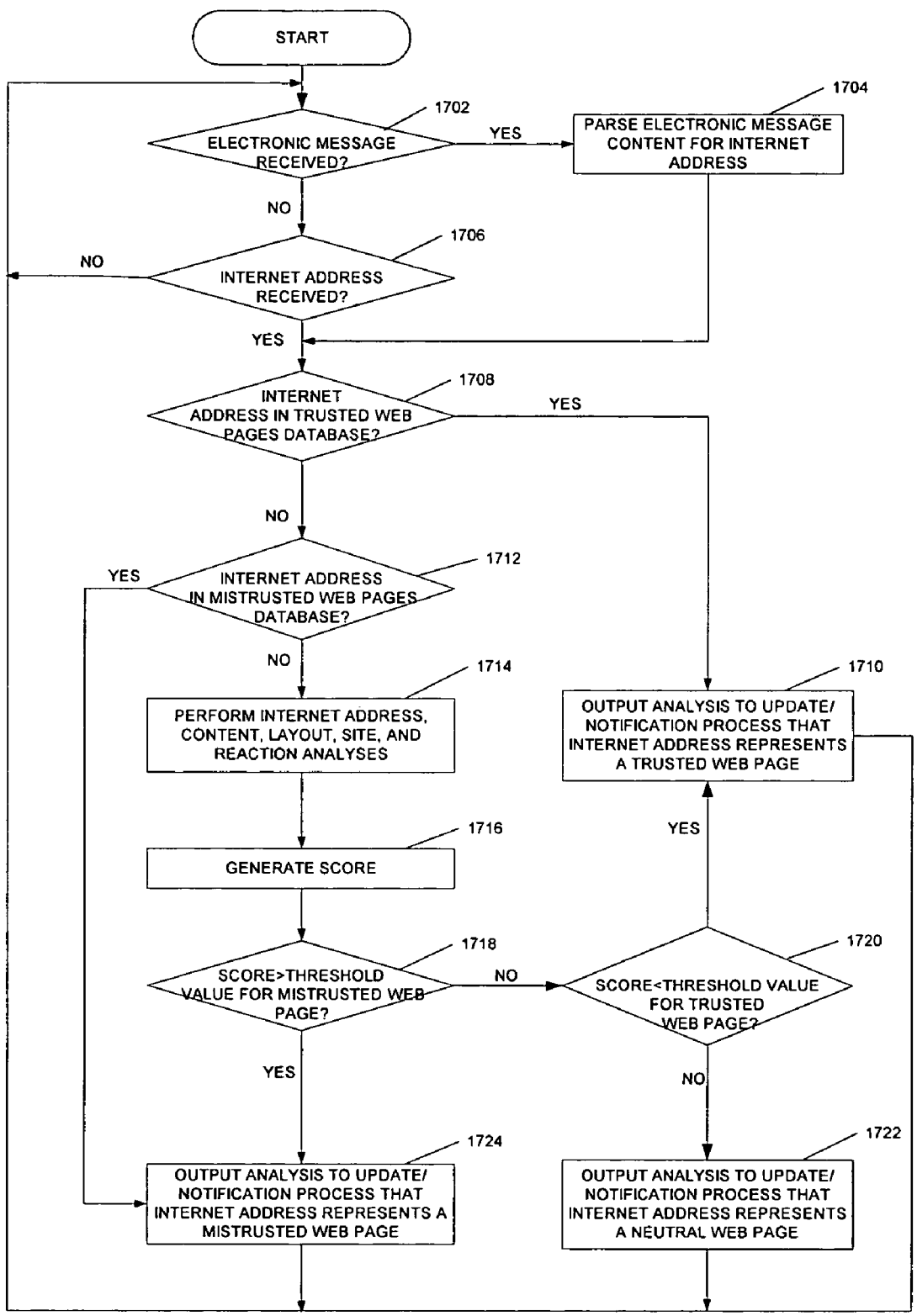
FIG. 17 is a flowchart of operation of a process executed by a security provider administrator of FIG. 4.

FIG. 17 is a flowchart of operation of analysis process 502 of security provider administrator 402. At a step 1702, security provider administrator 402 determines whether it has received an electronic message (e.g., as illustrated by screen 1000 of FIG. 10) for requested analysis (e.g., from an e-commerce provider, an individual customer, or an entity customer via network 118). If so, the operation continues to a step 1704.

At step 1704, security provider administrator 402 parses the electronic message's content for an Internet address (e.g., an Internet address associated with link 1004 of screen 1000). Moreover, at step 1704, security provider administrator 402 performs an analysis of the electronic message to determine whether the electronic message likely misrepresents the Internet address as representing a trusted web page. Security provider administrator 402 performs such analysis by analyzing the electronic message's content and header. In analyzing the electronic message's content, security provider administrator 402 detects an extent to which the content implements specified techniques for deceiving a user. In analyzing the electronic message's header, security provider administrator 402 detects an extent to which the header implements specified techniques for misrepresenting or concealing an actual source (e.g., source address) of the electronic message. After step 1704, the operation continues to a step 1708. In an alternative embodiment: (a) if security provider administrator 402 determines that the electronic message likely misrepresents the Internet address, the operation continues to step 1708; or (b) instead, if security provider administrator 402 determines otherwise, the operation returns to step 1702.

Referring again to step 1702, if security provider administrator 402 determines that it has not received an electronic message for requested analysis, the operation continues to a step 1706. At step 1706, security provider administrator 402 determines whether it has received an Internet address for requested analysis (e.g., from an e-commerce provider, an individual customer, or an entity customer via network 118, or from web-crawler 404). If not, the operation returns to step 1702. Conversely, if security provider administrator 402 determines that it has received an Internet address for requested analysis, the operation continues to step 1708.

At step 1708, security provider administrator 402 determines whether the Internet address is stored in trusted web pages database 508. If so, such determination indicates that the Internet address represents a trusted web page (and not a spoof web page). In that situation, the operation continues to a step 1710, where security provider administrator 402 outputs (to update/notification process 504) an analysis indicating that the Internet address represents a trusted web page. After step 1710, the operation returns to step 1702.

Conversely, if security provider administrator 402 determines at step 1708 that the Internet address is not stored in trusted web pages database 508, such determination indicates that further analysis is warranted. In that situation, the operation continues to a step 1712.

At step 1712, security provider administrator 402 determines whether the Internet address is stored in mistrusted web pages database 506. If so, such determination indicates that the Internet address represents a mistrusted ("spoof") web page (e.g., screen 900 of FIG. 9). In that situation, the operation continues to a step 1724. At step 1724, security provider administrator 402 outputs (to update/notification process 504) an analysis indicating that the Internet address represents a mistrusted "spoof" web page. After step 1724, the operation returns to step 1702.

Conversely, if security provider administrator 402 determines at step 1712 that the Internet address is not stored in the mistrusted web pages database 506, such determination indicates that further analysis is warranted. In that situation, the operation continues to a step 1714.

At step 1714, security provider administrator 402 performs one or more of the following analyses: an Internet address analysis, a content analysis, a layout analysis, a site analysis, and a reaction analysis. Each of these analyses is discussed in more detail hereinbelow.

The Internet address analysis determines whether a potential spoof web page is likely misrepresented by analyzing the web page's Internet address information (e.g., Uniform Resource Locator ("URL")). More specifically, the Internet address analysis determines a likelihood that the web page (associated with a particular URL) is a spoof web page by detecting an extent to which the web page's URL implements techniques for deceiving a user. For example, a spoof web page's URL often includes a widely known trusted URL or a part of such a URL, followed by a lengthy and complicated series of characters. The lengthy and complicated series of characters have an objective of concealing the actual URL, which is associated with the spoof web page. The following hypothetical example URL is associated with a spoof web page:

http://
www.wholesecurity.com%20long%20complicated%20@
www.spoofsite.com

A user may be deceived into perceiving that such URL is associated with "www.wholesecurity.com." However, in this example, such URL's substantive web page-identifying portion is www.spoofsite.com, which follows the "@" symbol. Accordingly, such URL is actually associated with "www.spoofsite.com" instead of "www.wholesecurity.com." The content analysis determines whether a potential spoof web page is likely misrepresented by analyzing the web page's content. More specifically, the content analysis determines a likelihood that the web page (associated with a particular URL) is a spoof web page by detecting an extent to which the web page's content implements techniques for deceiving a user. For example, a spoof web page's content often includes (a) content for deceiving a user to believe that the user is viewing a trusted web page, and (b) content for performing operations which harm the user (e.g., by obtaining the user's confidential, sensitive and/or financial information via information entry fields).

Accordingly, in response to determining that the web page's content includes a predetermined content, the content analysis determines that the web page is likely misrepresented as a trusted web page. For example, the content analysis detects: (a) whether the title or body of the web page's markup language content (e.g., HTML or XML content) includes a trusted web page's logo or name; and (b) whether the web page includes a form (e.g., including an information entry field) that ask a user to enter confidential, sensitive and/or financial information (e.g., the user's credit card account information or the user's bank account information).

The layout analysis determines whether a potential spoof web page is likely misrepresented by analyzing the web page's layout (e.g., organization of content) to determine whether the web page simulates or mimics a layout feature of a trusted web page. Accordingly, the layout analysis compares the potential spoof web page's layout to one or more layouts of one or more known mistrusted (e.g., spoof) web pages, so that the layout analysis determines whether the potential spoof web page's layout is similar to a layout of a known mistrusted web page. Such analysis is configurable to detect whether the potential spoof web page's layout is similar to the layout of the known mistrusted web page in any of the following ways, according to a specified preference of a security provider, e-commerce provider, or customer: (a) substantially similar, (b) substantially identical, and/or (c) exactly identical. Likewise, the layout analysis compares a potential spoof web page's layout to one or more layouts of one or more web pages that are known targets of web page spoofing (e.g., a web page of a known trusted e-commerce provider), so that the analysis determines whether the potential spoof web page's layout is similar to a layout of a known trusted web page.

A website includes one or more web pages. In comparison to a trusted website, a spoof website has: (a) a relatively young age; (b) relatively smaller size (e.g., relatively few hyperlinks to other web pages of the spoof website); and (c) and relatively few hyperlinks to it by known trusted web page resources, and vice versa. Also, unlike a trusted website, in an effort to avoid detection, operators of spoof websites frequently change the server (e.g., spoof server 114) on which the spoof website is hosted. Moreover, a spoof website is more likely to include hyperlinks to specified types of web pages that are infrequently hyperlinked by trusted websites.

Accordingly, the site analysis determines whether a potential spoof web page is likely misrepresented by analyzing information associated with the web page's website, so that such information is compared with known trusted websites. In at least one embodiment, such information includes: (a) an age (e.g., length of time of activity) of the potential spoof web page's website; (b) a size (e.g., a number of web pages) of the potential spoof web page's website; (c) a number of hyperlinks to the potential spoof web page's website by known trusted web pages, and vice versa; (d) a length of time (e.g., duration) that the potential spoof web page's website has been hosted by the website's server; and (e) whether the potential spoof web page's website includes hyperlinks to specified types of web pages that are infrequently hyperlinked by trusted websites.

The reaction analysis determines whether a potential spoof web page is likely misrepresented as a trusted resource by outputting a signal to a computing system (e.g., spoof server 114) that hosts the web page and analyzing the computing system's response (e.g., reaction) thereto. For example, the signals include information requested by information entry fields embedded in the web page. A spoof web page's response (from its associated spoof server that hosts the spoof web page) is frequently different from a similar trusted web page's response (from its associated trusted server that hosts the trusted web page). Accordingly, the reaction analysis compares the potential spoof web page's response to the similar trusted web page's response.

After step 1714, the operation continues to a step 1716, where security provider administrator 402 determines (e.g., generates) a score indicating a likelihood that the Internet address represents a spoof web page, in response to the analyses performed at steps 1704 and 1714.

In at least one embodiment, in response to each of analyses performed at steps 1704 and 1714, security provider administrator 402 outputs a respective indication of whether the web page is likely misrepresented as a trusted web page. Accordingly, at step 1716, security provider administrator 402 generates a score in response to a scoring algorithm, which weighs each of the respective indications from each of the analyses performed at steps 1704 and 1714. After step 1716, the operation continues to a step 1718.

At step 1718, security provider administrator 402 determines whether the score generated at 1716 exceeds a first threshold value. If so, the score indicates that the web page associated with the Internet address is likely a mistrusted web page. If security provider administrator 402 determines that the score exceeds the first threshold value, the operation continues to step 1724.

At step 1724, security provider administrator 402 outputs (to update/notification process 504) an analysis indicating that the Internet address likely represents a mistrusted web page. After step 1724, the operation returns to step 1702.

Referring again to step 1718, if security provider administrator 402 determines that the score does not exceed the first threshold value, the operation continues to a step 1720. At step 1720, security provider administrator 402 determines whether the score is less than a second threshold value. If so, the score indicates that the web page associated with the Internet address is likely a trusted web page. If security provider administrator 402 determines that the score is less than the second threshold value, the operation continues to step 1710. In the illustrative embodiment, the first threshold value is higher than the second threshold value. In an alternative embodiment, the first threshold value is equal to the second threshold value. At step 1710, security provider administrator 402 outputs (to update/notification process 504) an analysis indicating that the Internet address likely represents a trusted web page. After step 1710, the operation returns to step 1702.

Referring again to step 1720, if security provider administrator 402 determines that the score is not less than the second threshold value, the score indicates that the web page associated with the Internet address is inconclusively either a trusted web page or a mistrusted web page. Accordingly, the Internet address represents a neutral web page, and the operation continues to a step 1722.

At step 1722, security provider administrator 402 outputs (to update/notification process 504) an analysis indicating that the Internet address represents a neutral web page. After step 1722, the operation returns to step 1702.

Figure 18:
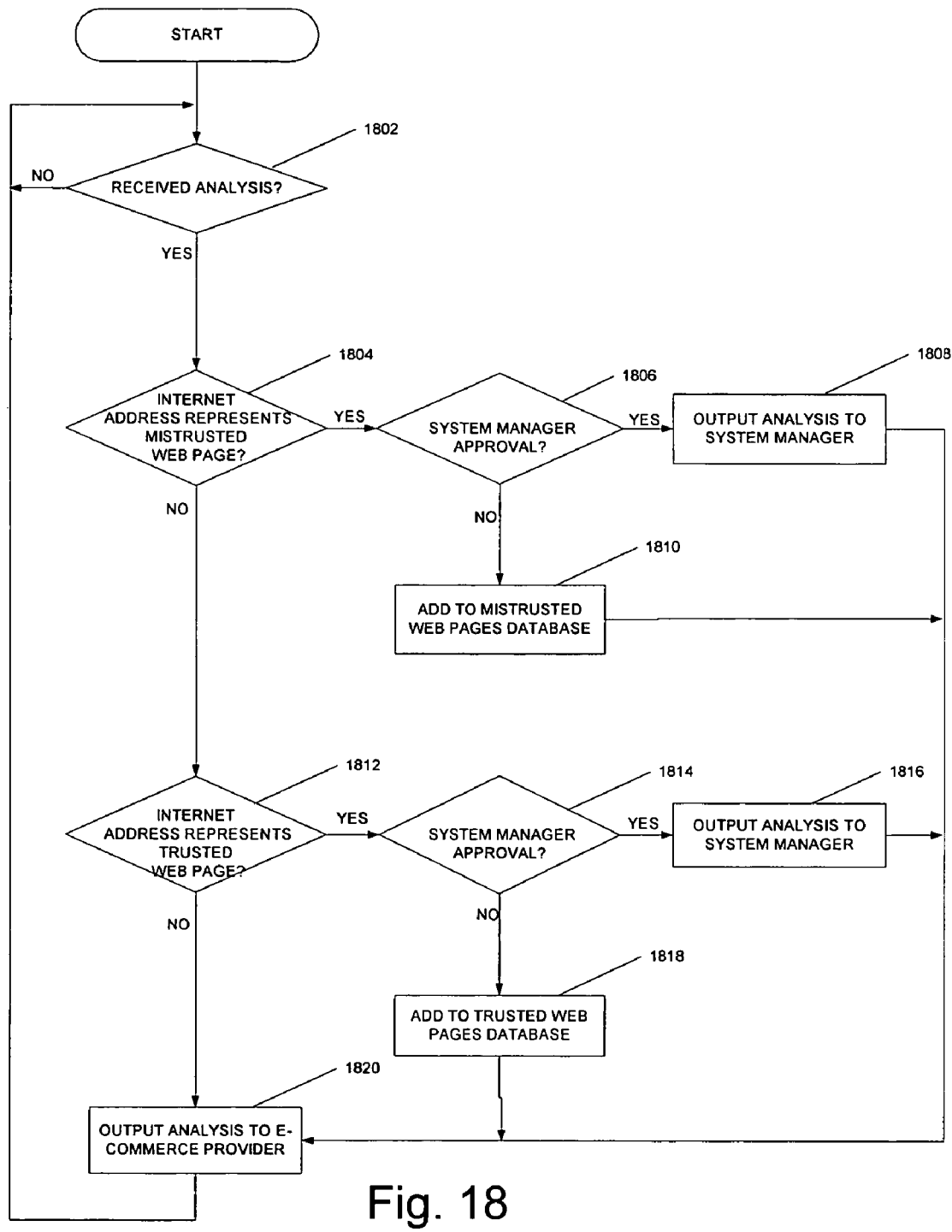
FIG. 18 is a flowchart of operation of another process executed by the security provider administrator of FIG. 4.

FIG. 18 is a flowchart of operation of update/notification process 504 executed by security provider administrator 402. At a step 1802, the operation self-loops until security provider administrator 402 determines that it has received an analysis from analysis process 502. In response to security provider administrator 402 determining that it has received an analysis from analysis process 502, the operation continues to a step 1804.

At step 1804, security provider administrator 402 determines whether the received analysis indicates that the Internet address (associated with the analysis) represents a mistrusted web page. If so, the operation continues to a step 1806, where security provider administrator 402 determines whether it is specified to output the analysis to human system manager 406 for further analysis. If so, the operation continues to a step 1808.

At step 1808, security provider administrator 402 outputs the analysis to human system manager 406 for further analysis. After step 1808, the operation continues to a step 1820, where security provider administrator 402 outputs the analysis to an e-commerce provider (e.g., e-commerce provider 102). After step 1820, the operation returns to step 1802.

Referring again to step 1806, if security provider administrator 402 is not specified to output the analysis to human system manager 406 for further analysis, the operation continues to a step 1810. At step 1810, security provider administrator 402 writes the Internet address (associated with the analysis) for storage in mistrusted web pages database 506. After step 1810, the operation continues to step 1820.

Referring again to step 1804, if the received analysis indicates that the Internet address (associated with the analysis) does not represent a mistrusted web page, the operation continues to a step 1812. At step 1812, the security provider administrator 402 determines whether the received analysis indicates that the Internet address (associated with the analysis) represents a trusted web page. If so, the operation continues to a step 1814.

At step 1814, security provider administrator 402 determines whether it is specified to output the analysis to human system manager 406 for further analysis. If so, the operation continues to a step 1816, where security provider administrator 402 outputs the analysis to human system manager 406 for further analysis. After step 1808, the operation continues to a step 1820.

Conversely, if security provider administrator 402 determines at step 1814 that it is not specified to output the analysis to human system manager 406 for further analysis, the operation continues to a step 1818. At step 1818, security provider administrator 402 writes the Internet address (associated with the analysis) for storage in trusted web pages database 508. After step 1818, the operation continues to step 1820.

Referring again to FIG. 7, plug-in 706 is plug-in software, which representative clients 602 and 804 execute in conjunction with web browser software (e.g., web browser 704). Plug-in 706 is an Internet Explorer Plug-in, or alternatively another type of plug-in. In the illustrative embodiment, each of representative clients 602 and 804 stores (within their hard disks in configuration files or as cookies, or within their memories as in-memory databases) a copy of mistrusted web pages database 716 and trusted web pages database 718.

In the illustrative embodiment, client 602 downloads (e.g., receives) and stores its copy of plug-in 706 from a trusted source (e.g., security provider 120 or e-commerce provider 102) through network 118. Such copy of plug-in 706 is executed by client 602.

Moreover, in response to its execution of update process 712, client 602 updates its copy of detection process 708, analysis process 710, mistrusted web pages database 716, and trusted web pages database 718. While executing update process 712, client 602 determines whether its copy of detection process 708 is up-to-date. If so, client 602 continues with normal operation. Conversely, if client 602 determines that its copy of detection process 708 is not up-to-date, client 602 downloads and stores an up-to-date version of detection process 708 from a trusted source (e.g., security provider 120 or e-commerce provider 102).

In response to its execution of update process 712, entity customer administrator 802: (a) downloads and stores its copy of plug-in 706 from a trusted source (e.g., security provider 120 or e-commerce provider 102) through network 118, similar to the manner in which client 602 downloads its copy; (b) updates its copy of detection process 708, analysis process 710, mistrusted web pages database 716, and trusted web pages database 718, similar to the manner in which client 602 updates its copy; and (c) outputs them to its connected clients (e.g., client 804) while executing its copy of update process 712.

Figure 19:
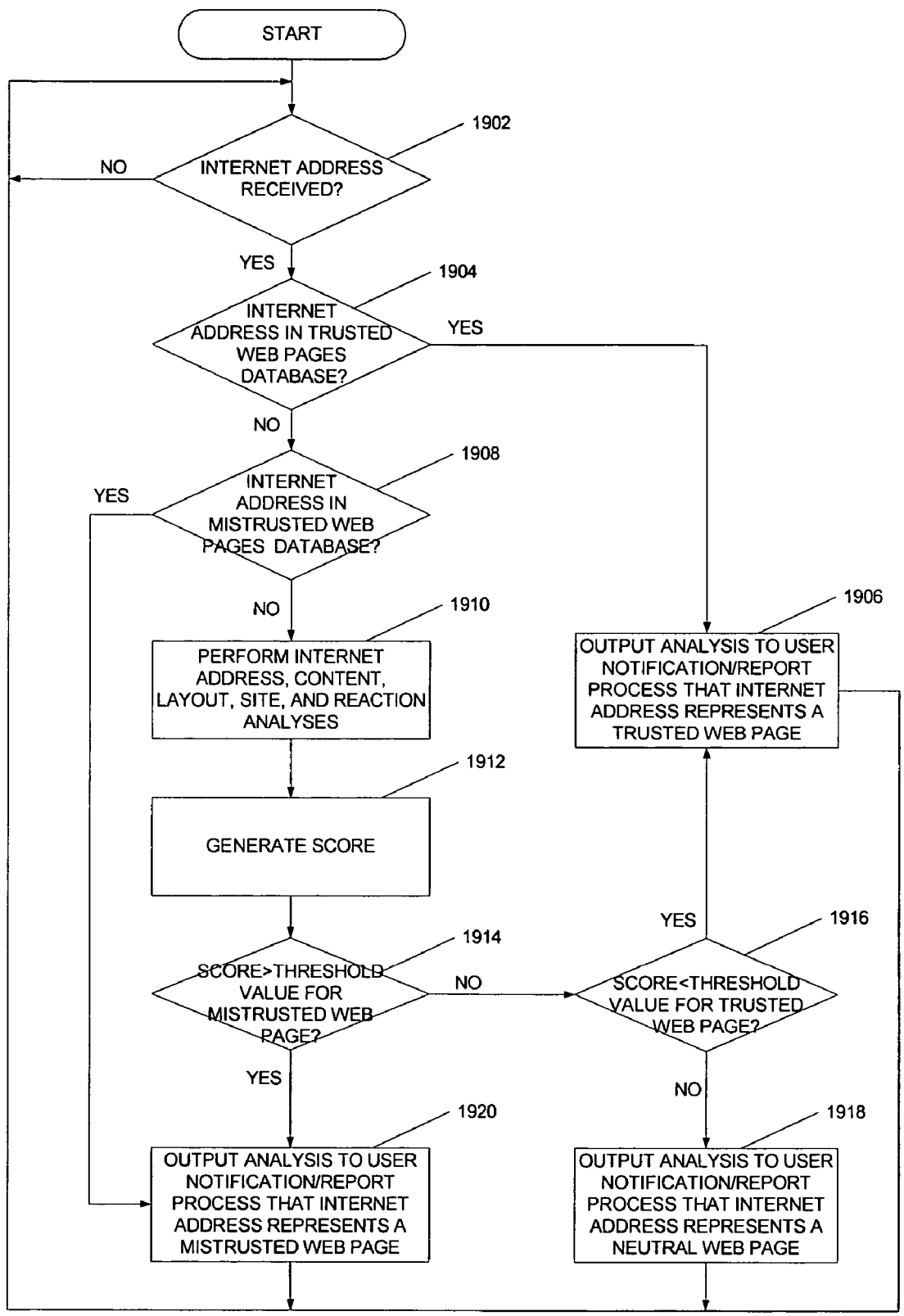
FIG. 19 is a flowchart of operation of a process executed by a customer of FIG. 1.

FIG. 19 is a flowchart of operation of analysis process 710, which is executed by representative clients 602 and 804. In the following discussion, client 602 is a representative one of clients 602 and 804. After a user (e.g., human user 604) enters an Internet address in web browser 704, client 602 outputs the Internet address for analysis to analysis process 710.

As shown in FIG. 19, operation begins at a step 1902. At step 1902, the operation self-loops until client 602 determines that it has received an Internet address for analysis. In response to client 602 determining that it has received an Internet address for analysis, the operation continues to a step 1904.

At step 1904, client 602 determines whether the Internet address is stored in trusted web pages database 718. If client 602 determines that the Internet address is stored in database 718, such determination indicates that the Internet address represents a trusted web page (and not a spoof web page). Accordingly, the operation continues to a step 1906, where client 602 outputs (to user notification/report process 714) an analysis indicating that the Internet address represents a trusted web page. After step 1906, the operation returns to step 1902.

Referring again to step 1904, if client 602 determines that the Internet address is not stored in trusted web pages database 718, such determination indicates that further analysis by client 602 is warranted. Accordingly, the operation continues to a step 1908.

At step 1908, client 602 determines whether the Internet address is stored in mistrusted web pages database 716. If client 602 determines that the Internet address is stored in mistrusted web pages database 716, such determination indicates that the Internet address represents a mistrusted web page (e.g., as illustrated by screen 900). Accordingly, the operation continues to a step 1920, where client 602 outputs (to user notification/report process 714) an analysis indicating that the Internet address represents a mistrusted web page. After step 1920, the operation returns to step 1902.

Referring again to step 1908, if client 602 determines that the Internet address is not stored in the mistrusted web pages database 716, such determination indicates that further analysis by client 602 is warranted. Accordingly, the operation continues to a step 1910.

At step 1910, client 602 performs one or more analyses, including one or more of: an Internet address analysis, a content analysis, a layout analysis, a site analysis, and a reaction analysis. Each of above analyses is discussed further hereinabove in connection with FIG. 17. After step 1910, the operation continues to a step 1912, where client 602 generates a score indicating a likelihood that the Internet address represents a mistrusted web page, in response to the analyses performed at step 1910.

In at least one embodiment, in response to each of analyses performed at step 1910, client 602 outputs a respective indication of whether the Internet address likely represents a mistrusted web page. Accordingly, at step 1912, client 602 generates a score in response to a scoring algorithm, which weighs the each of the respective indications from each of the analyses performed at step 1910. After step 1912, the operation continues to a step 1914.

At step 1914, client 602 determines whether the score generated at 1912 exceeds a first threshold value. If so, the score indicates that the web page associated with the Internet address is likely a mistrusted web page. If client 602 determines that the score exceeds the first threshold value, the operation continues to step 1920.

At step 1920, client 602 outputs (to user notification/report process 714) an analysis indicating that the Internet address represents a mistrusted web page. After step 1920, the operation returns to step 1902.

Referring again to step 1914, if client 602 determines that the score does not exceed the first threshold value, the operation continues to a step 1916. At step 1916, client 602 determines whether the score is less than a second threshold value. If so, the score indicates that the web page associated with the Internet address is likely a trusted web page. If client 602 determines that the score is less than the second threshold value, the operation continues to step 1906. In the illustrative embodiment, the first threshold value is higher than the second threshold value. In an alternative embodiment, the first threshold value is equal to the second threshold value.

At step 1906, client 602 outputs (to user notification/report process 714), an analysis indicating that the Internet address represents a trusted web page. After step 1906, the operation returns to step 1902.

Referring again to step 1916, if client 602 determines that the score is not less than the second threshold value, the score indicates that the web page associated with the Internet address is inconclusively either a trusted web page or a mistrusted web page. Accordingly, the Internet address represents a neutral web page, and the operation continues to a step 1918.

At step 1918, client 602 outputs (to user notification/report process 714) an analysis indicating that the Internet address represents a neutral web page. After step 1918, the operation returns to step 1902.

Figure 20:
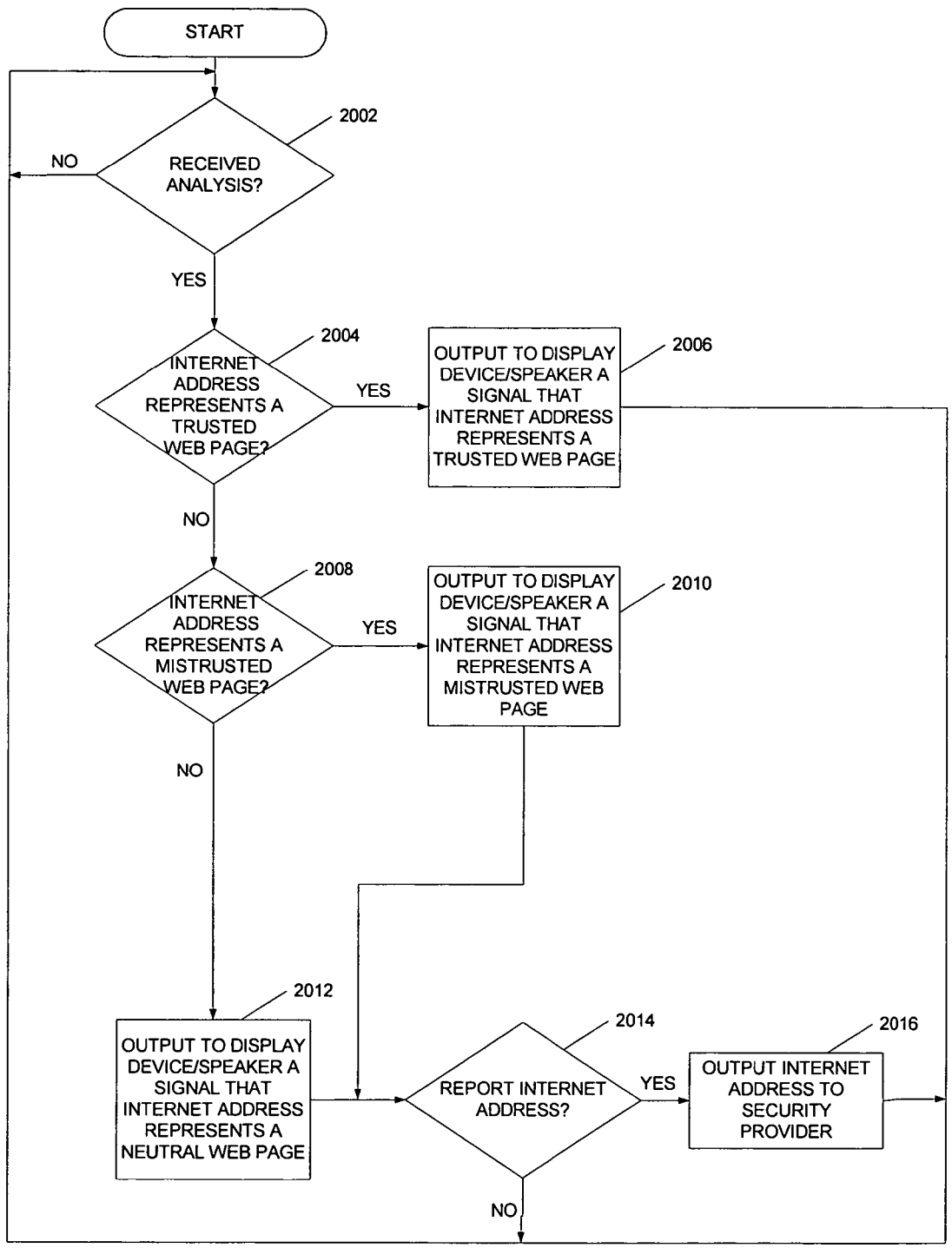
FIG. 20 is a flowchart of operation of another process executed by a customer of FIG. 1.

FIG. 20 is a flowchart of operation of user notification/report process 714 executed by client 602. At a step 2002, the operation self-loops until client 602 determines that it has received an analysis from analysis process 710. In response to client 602 determining that it has received an analysis from analysis process 710, the operation continues to a step 2004.

At step 2004, client 602 determines whether the received analysis indicates that the Internet address (associated with the analysis) represents a trusted web page. If so, the operation continues to a step 2006, where client 602 outputs a screen (e.g., screen 1300) to a display device. (e.g., display device 208), and/or outputs audio signals to speakers (e.g., internal speakers of computing system 200), indicating that the Internet address (associated with the analysis) represents a trusted web page. After step 2006, the operation returns to step 2002.

Conversely, if the received analysis indicates that the Internet address (associated with the analysis) does not represent a trusted web page, the operation continues from step 2004 to a step 2008. At step 2008, client 602 determines whether the received analysis indicates that the Internet address (associated with the analysis) represents a mistrusted web page. If so, the operation continues to a step 2010.

At step 2010, client 602's computer outputs a screen (e.g., screen 1200) to a display device (e.g., display device 208), and/or outputs audio signals to speakers (e.g., internal speakers of computing system 200), indicating that the Internet address (associated with the analysis) represents a mistrusted web page. After step 2010, the operation continues to step 2014.

Referring again to FIG. 12, a display device (e.g., display device 208) displays screen 1200 in response to client 602 outputting a signal indicating that the Internet address represents a mistrusted web page. Screen 1200 includes tool bar 1202, which is a region of screen 1200. Likewise, screen 1300 (FIGS. 13 and 14) includes tool bar 1304, which is a region of screen 1300.

As shown in FIGS. 12, 13 and 14, screens 1200 and 1300 include distinct respective messages, in response to whether an Internet address represents: (a) a mistrusted web page (as shown in tool bar 1202 of FIG. 12); (b) a trusted web page (as shown in tool bar 1304 of FIGS. 13 and 14); or (c) a neutral web page.

Screen 1200 also includes a dialog box 1204, which is a region of screen 1200 for displaying various information to a user (e.g., human user 604) about a mistrusted web page. Dialog box 1204 includes buttons 1206, 1208, 1210, and 1212, respectively clickable by the user for selectively causing client 602 to perform various operations. For example, in response to the user clicking button 1206, client 602 causes web browser 704 to display the user's pre-defined homepage. In response to the user clicking button 1208, client 602 causes web browser 704 to display the mistrusted web page that is represented by the Internet address. In response to the user clicking button 1210, client 602 closes web browser 704 (e.g., ceases executing web browser 704). In response to the user clicking button 1210, client 602 outputs the Internet address (representing a mistrusted web page) to security provider 120 through network 118.

In an alternative embodiment, in response to client 602 determining that the Internet address represents a mistrusted web page, the display device of client 602 does not display dialog box 1204, but instead displays a message (in tool bar 1202) indicating that the Internet address represents a misrepresented web page. In at least one version of such alternative embodiment, client 602 does not display the web page (represented by the Internet address) in web browser 704.

Referring again to FIG. 20, at step 2014, client 602 determines whether it is specified to report the Internet address to a security provider (e.g., security provider 120). If so (e.g., if user has clicked button 1210), the operation continues to step 2016. At step 2016, client 602 outputs the Internet address to a security provider (e.g., security provider 120) through network 118. If client 602 determines at step 602 that it is not specified to report the Internet address to a security provider, the operation returns to step 2002.

Referring again to step 2008, if client 602 determines that the received analysis indicates that the Internet address (associated with the analysis) does not represent a mistrusted web page, the operation continues to a step 2012. At step 2012, client 602 outputs a screen (e.g., screen 1300) to a display device (e.g., display device 208), and/or outputs audio signals to speakers (e.g., internal speakers of computing system 200), indicating that the Internet address (associated with the analysis) represents a neutral web page. After step 2012, the operation continues to step 2014.

Referring again to FIG. 2, computer-readable medium 212 is a floppy diskette. Computer-readable medium 212 and computer 204 are structurally and functionally interrelated with one another as described further hereinbelow. Each IHS of the illustrative embodiment is structurally and functionally interrelated with a respective computer-readable medium, similar to the manner in which computer 204 is structurally and functionally interrelated with computer-readable medium 212. In that regard, computer-readable medium 212 is a representative one of such computer-readable media, including for example but not limited to storage device 211.

Computer-readable medium 212 stores (e.g., encodes, or records, or embodies) functional descriptive material (e.g., including but not limited to software (also referred to as computer programs or applications) and data structures). Such functional descriptive material imparts functionality when encoded on computer-readable medium 212. Also, such functional descriptive material is structurally and functionally interrelated to computer-readable medium 212.

Within such functional descriptive material, data structures define structural and functional interrelationships between such data structures and computer-readable medium 212 (and other aspects of computer 204, computing system 200 and system 100). Such interrelationships permit the data structures' functionality to be realized. Also, within such functional descriptive material, computer programs define structural and functional interrelationships between such computer programs and computer-readable medium 212 (and other aspects of computer 204, computing system 200 and system 100). Such interrelationships permit the computer programs' functionality to be realized.

For example, computer 204 reads (e.g., accesses or copies) such functional descriptive material from computer-readable medium 212 into the memory device of computer 204, and computer 204 performs its operations (as described elsewhere herein) in response to such material which is stored in the memory device of computer 204. More particularly, computer 204 performs the operation of processing a computer application (that is stored, encoded, recorded or embodied on a computer-readable medium) for causing computer 204 to perform additional operations (as described elsewhere herein). Accordingly, such functional descriptive material exhibits a functional interrelationship with the way in which computer 204 executes its processes and performs its operations.

Further, the computer-readable medium is an apparatus from which the computer application is accessible by computer 204, and the computer application is processable by computer 204 for causing computer 204 to perform such additional operations. In addition to reading such functional descriptive material from computer-readable medium 212, computer 204 is capable of reading such functional descriptive material from (or through) network 112 which is also a computer-readable medium (or apparatus). Moreover, the memory device of computer 204 is itself a computer-readable medium (or apparatus).

Although illustrative embodiments have been shown and described, a wide range of modification, change and substitution is contemplated in the foregoing disclosure and, in some instances, some features of the embodiments may be employed without a corresponding use of other features.

What is claimed is:

1. A tangible computer-readable memory medium storing program instructions within a security program that are executable on an information handling system to:
   receive data from an external network coupled to the information handling system, wherein the received data includes a first set of data for a web page;
   analyze the first set of data to make a determination whether the first set of data indicates that it is from a first source coupled to the external network, but is actually from a second source coupled to the external network, wherein the determination is based, at least in part, on an age of the first set of data;
   upon the determination that the first set of data is actually from the second source, provide output from the information handling system indicative of the determination.

2. The tangible computer-readable memory medium of claim 1, wherein the first set of data includes information indicating that it is from a source trusted by a user of the information handling system.

3. The tangible computer-readable memory medium of claim 2, wherein the first set of data is intended to cause the user to supply confidential information to a source other than the trusted source.

4. The tangible computer-readable memory medium of claim 3, wherein the confidential information is financial information of the user.

5. The tangible computer-readable memory medium of claim 3, wherein the confidential information is login information of the user.

6. The tangible computer-readable memory medium of claim 1, further comprising program instructions within the security program that are executable on the information handling system to block display of the web page by the information handling system upon the determination that the first set of data is actually from the second source.

7. The tangible computer-readable memory medium of claim 1, wherein the output from the information handling system is provided by the security program to a user of the information handling system that requested the web page.

8. The tangible computer-readable memory medium of claim 1, wherein the output from the information handling system is provided by the security program via a network to a security provider.

9. A method, comprising:
   a security program on a first computing device receiving a web page via a wide-area network, wherein the web page includes information indicating that its origin is a first source that is trusted by a user of the first computing device;
   the security program on the first computing device sending data that is requested by the web page to the origin of the web page;
   the security program on the first computing device analyzing the origin's response to the sent data to make a determination whether the origin of the web page is the first source; and
   upon the determination that the origin of the web page is not the first source, providing output from the first computing device that is indicative of the determination.

10. The method of claim 9, wherein the web page solicits confidential information from the user.

11. The method of claim 9, further comprising the security program blocking display of the web page by the first computing device upon the determination that the origin of the web page is not the first source.

12. The method of claim 9, wherein the output is provided to a user of the first computing device that requested the web page.

13. The method of claim 9, wherein the output is provided via a network to a security provider.

14. A method, comprising:
   a security program on a computing device making a determination of the likelihood that a web page received via a computer network is misrepresented as being from a trusted source, including:
     the security program analyzing a layout of the received web page;
     the security program determining that the layout of the received web page is similar to a layout of a known mistrusted web page;
   upon determining that the layout of the received web page is similar to the layout of the known mistrusted web page, the computing device providing output indicative of the likelihood that the received web page is misrepresented as being from the trusted source.

15. The method of claim 14, wherein said making said determination further includes the security program determining whether the web page's markup language contains the trusted source's name or logo and whether the web page has the same organization of content as the trusted source.

16. The method of claim 14, further comprising the security program blocking display of the web page by the computing device upon determining that the layout of the received web page is similar to the layout of the known mistrusted web page.

17. The method of claim 14, wherein the output is provided to a user of the computing device that requested the web page.

18. The method of claim 14, wherein the output is provided via a network to a security provider.

19. A method, comprising:
    a security program on a computing device making a determination of the likelihood that a web page received via a computer network is misrepresented as being from a trusted source, wherein the determination is based on one or more of the following criteria: an age of the web page, a size of the web page, a number of hyperlinks to the web page from trusted sources; and
    the computing device providing output indicative of the determination.

20. The method of claim 19, wherein the determination is based, at least in part, on the age of the web page and the size of the web page.

21. The method of claim 19, wherein the determination is based, at least in part, on the age of the web page and the number of hyperlinks to the web page from trusted sources.

22. The method of claim 19, further comprising the security program blocking display of the web page by the computing device upon determining that the web page is likely misrepresented as being from the trusted source.

23. The method of claim 19, wherein the output is provided to a user of the computing device that requested the web page.

24. The method of claim 19, wherein the output is provided via a network to a security provider.

25. A tangible computer-readable memory medium storing program instructions within a security program that are executable on a computing device to:
    make a determination of the likelihood that a web page received via a computer network is misrepresented as being from a trusted source coupled to the computer network, including:
        analyzing a layout of the received web page;
        determining that the layout of the received web page is similar to a layout of a known mistrusted web page;
    upon determining that the layout of the received web page is similar to the layout of the known mistrusted web page, provide output from the computing device indicative of the likelihood that the received web page is misrepresented as being from the trusted source.

26. The tangible computer-readable memory medium of claim 25, further comprising program instructions within the security program that are executable on the computing device to block display of the web page by the computing device upon determining that the layout of the received web page is similar to the layout of a known mistrusted web page.

27. The tangible computer-readable memory medium of claim 25, wherein the output from the computing device is provided by the security program to a user of the computing device that requested the web page.

28. The tangible computer-readable memory medium of claim 25, wherein the output from the computing device is provided by the security program via a network to a security provider.

29. A tangible computer-readable memory medium storing program instructions within a security program that are executable on a computing device to:
    make a determination of the likelihood that a web page received at the computing device from a computer network is misrepresented as being from a trusted source, wherein the determination is based on one or more of the following criteria: an age of the web page, a size of the web page, a number of hyperlinks to the web page from known trusted sources; and
    provide output from the computing device indicative of the determination.

30. The tangible computer-readable memory medium of claim 29, further comprising program instructions within the security program that are executable on the computing device to block display of the web page by computing device upon determining that the web page is likely misrepresented as being from the trusted source.

31. The tangible computer-readable memory medium of claim 29, wherein the output from the computing device is provided by the security program to a user of the computing device that requested the web page.

32. The tangible computer-readable memory medium of claim 29, wherein the output from the computing device is provided by the security program via a network to a security provider.

33. A tangible computer-readable memory medium storing program instructions within a security program that are executable on a computing device to:
    receive a web page via a wide-area network, wherein the web page includes information indicating that its origin is a first source that is trusted by a user of the computing device;
    send data that is requested by the web page to the origin of the web page;
    analyze the origin's response to the sent data to make a determination whether the origin of the web page is the first source; and
    upon the determination that the origin of the web page is not the first source, provide output from the computing device indicative of the determination.

34. The tangible computer-readable memory medium of claim 33, further comprising program instructions within the security program that are executable on the computing device to block display of the web page by the computing device upon the determination that the origin of the web page is not the first source.

35. The tangible computer-readable memory medium of claim 33, wherein the output from the computing device is provided by the security program to a user of the computing device that requested the web page.

36. The tangible computer-readable memory medium of claim 33, wherein the output from the computing device is provided by the security program via a network to a security provider.

37. A tangible computer-readable memory medium storing program instructions within a security program that are executable on an information handling system to:
    receive data from an external network coupled to the information handling system;
    analyze the received data to make a determination whether the received data indicates that it is from a first source coupled to the external network, but is actually from a second source coupled to the external network, and wherein the determination is based, at least in part, on a size of the received data;

upon the determination that the received data is actually from the second source, provide output from the information handling system indicative of the determination.

38. The tangible computer-readable memory medium of claim 37, wherein the received data is data for a first web page, and wherein the determination is based, at least in part, on the size of the first web page.

39. The tangible computer-readable memory medium of claim 37, further comprising program instructions within the security program that are executable on the information handling system to block display of the received data by the information handling system upon the determination that the received data is actually from the second source.

40. The tangible computer-readable memory medium of claim 37, wherein the output from the information handling system is provided by the security program to a user of the information handling system that requested the received data.

41. The tangible computer-readable memory medium of claim 37, wherein the output from the information handling system is provided by the security program via a network to a security provider.

* * * * *

UNITED STATES PATENT AND TRADEMARK OFFICE
CERTIFICATE OF CORRECTION

PATENT NO. : 7,624,110 B2
APPLICATION NO. : 10/733655
DATED : November 24, 2009
INVENTOR(S) : Alagna et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1173 days.

Signed and Sealed this

Twenty-sixth Day of October, 2010

David J. Kappos
*Director of the United States Patent and Trademark Office*